United States Patent
Ali et al.

(10) Patent No.: US 11,475,149 B2
(45) Date of Patent: Oct. 18, 2022

(54) METHOD AND SYSTEM FOR GENERATING A SECURITY-COMPLIANT WORKLOAD IN A COMPOSABLE INFRASTRUCTURE

(71) Applicant: Dell Products L.P., Hopkinton, MA (US)

(72) Inventors: Rizwan Ali, Cedar Park, TX (US); Ravikanth Chaganti, Bangalore (IN); Dharmesh M. Patel, Round Rock, TX (US)

(73) Assignee: Dell Products L.P., Hopkinton, MA (US)

( * ) Notice: Subject to any disclaimer, the term of this patent is extended or adjusted under 35 U.S.C. 154(b) by 294 days.

(21) Appl. No.: 16/808,764

(22) Filed: Mar. 4, 2020

(65) Prior Publication Data

US 2021/0279352 A1    Sep. 9, 2021

(51) Int. Cl.
*G06F 21/62* (2013.01)
*G06F 21/60* (2013.01)
*G06F 9/50* (2006.01)
*G06F 21/57* (2013.01)

(52) U.S. Cl.
CPC ........ *G06F 21/6218* (2013.01); *G06F 9/5011* (2013.01); *G06F 9/5083* (2013.01); *G06F 21/577* (2013.01); *G06F 21/602* (2013.01)

(58) Field of Classification Search
CPC .. G06F 21/6218; G06F 9/5011; G06F 9/5083; G06F 21/577; G06F 21/602; G06F 21/64
See application file for complete search history.

(56) References Cited

U.S. PATENT DOCUMENTS

| | | | | |
|---|---|---|---|---|
| 8,255,829 B1* | 8/2012 | McCormick | ........... | G06Q 10/10 715/810 |
| 9,171,178 B1* | 10/2015 | Banerjee | ................. | G06F 21/62 |
| 2012/0331563 A1* | 12/2012 | Chaudhury | ......... | G06F 21/6218 726/27 |
| 2014/0052864 A1* | 2/2014 | Van Der Linden | ..... | H04L 47/70 709/226 |
| 2015/0067761 A1* | 3/2015 | Bade | ....................... | H04L 63/20 726/1 |
| 2016/0173573 A1* | 6/2016 | Chan | ...................... | H04L 43/50 709/226 |

* cited by examiner

*Primary Examiner* — Meng Li
(74) *Attorney, Agent, or Firm* — Chamberlain, Hrdlicka, White, Williams & Aughtry

(57) ABSTRACT

A method for managing data includes obtaining a workload generation request, wherein the workload generation request specifies a security compliant rule, in response to the workload generation request: selecting a first set of resource devices using a resource allocation master list, initiating a security compliance test on the first set of resource devices to obtain a security compliance result, making a first determination, based on the security compliance result, that the first set of resource devices meet a security compliance criterion, and in response to the first determination: storing a virtual certificate in a security compliance database based on the security compliance result, and allocating the first set of resource devices to a workload based on the workload generation request.

17 Claims, 23 Drawing Sheets

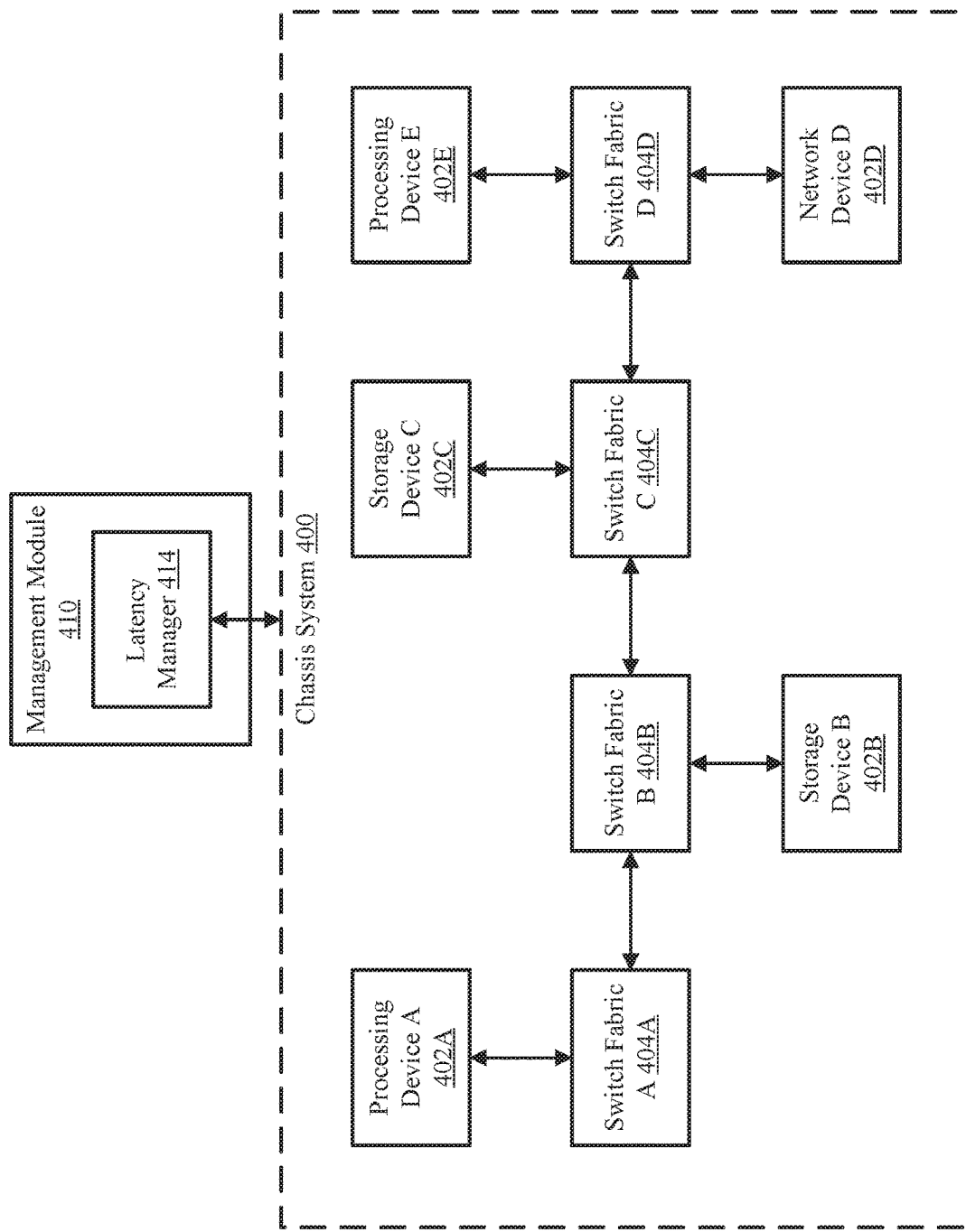
FIG. 4.1A

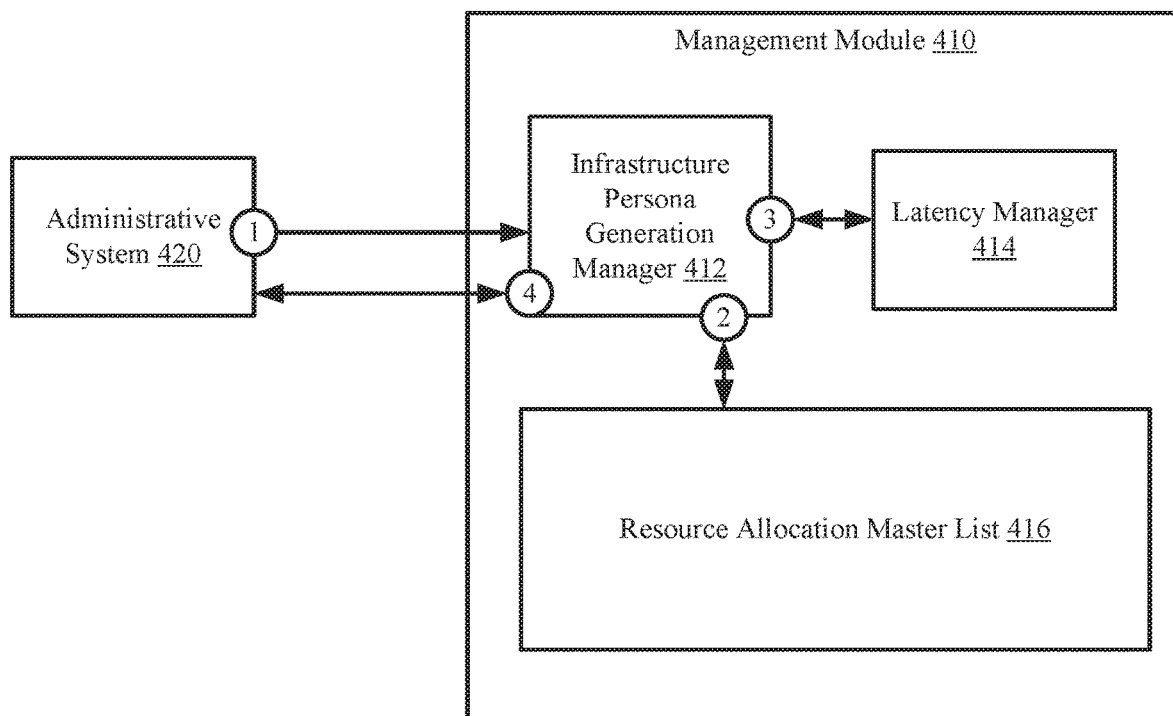
FIG. 4.1B

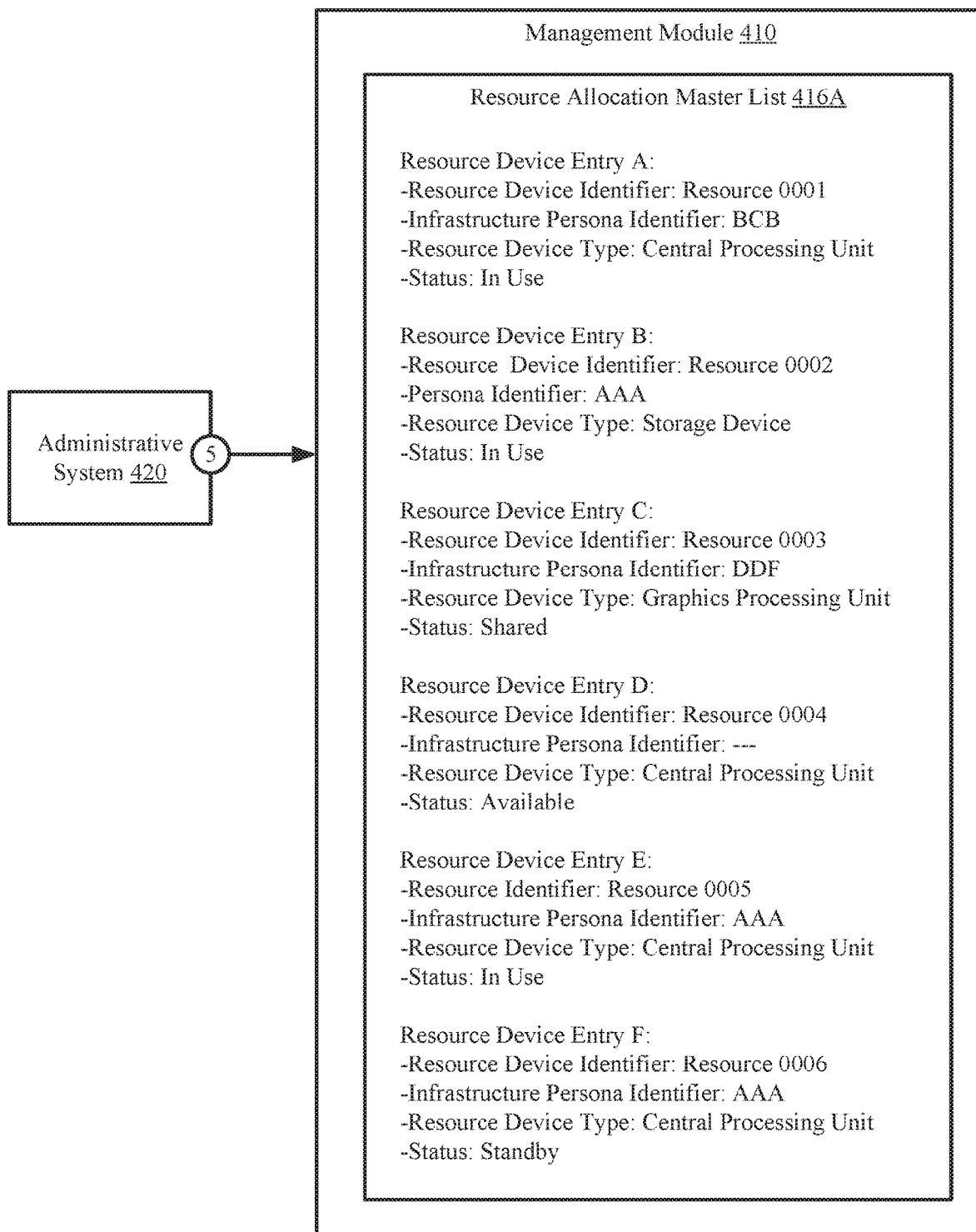
FIG. 4.2A

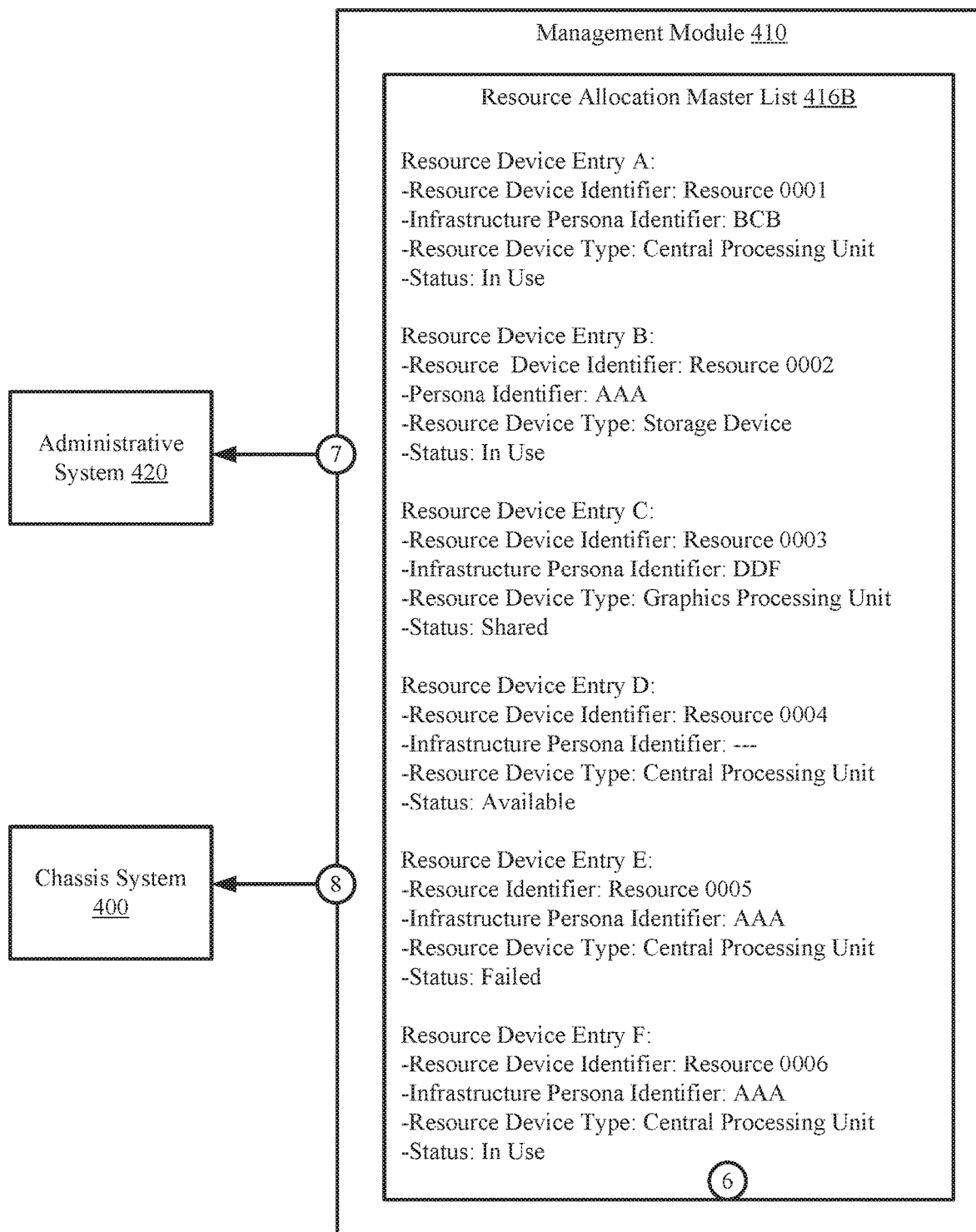
FIG. 4.2B

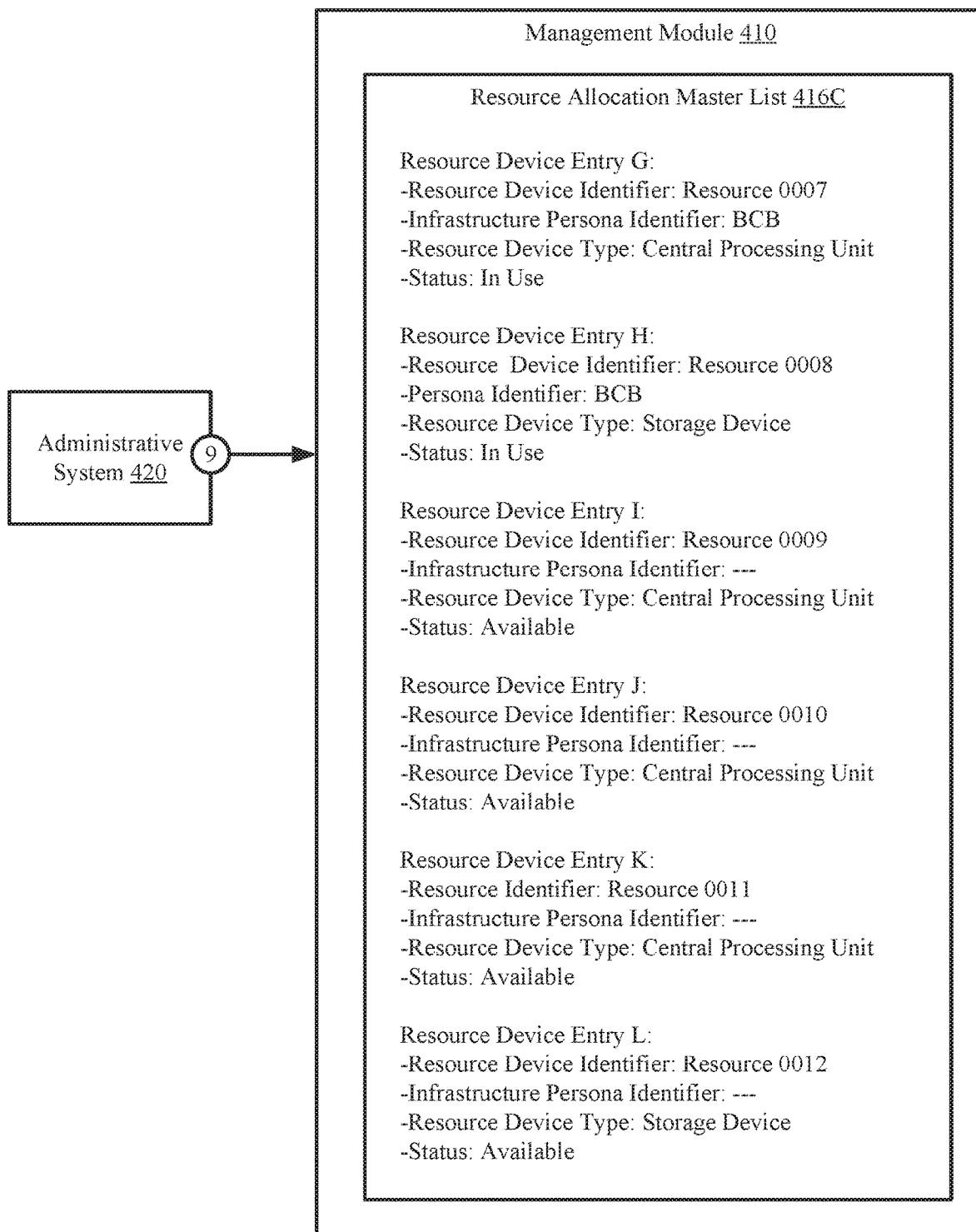
FIG. 4.3A

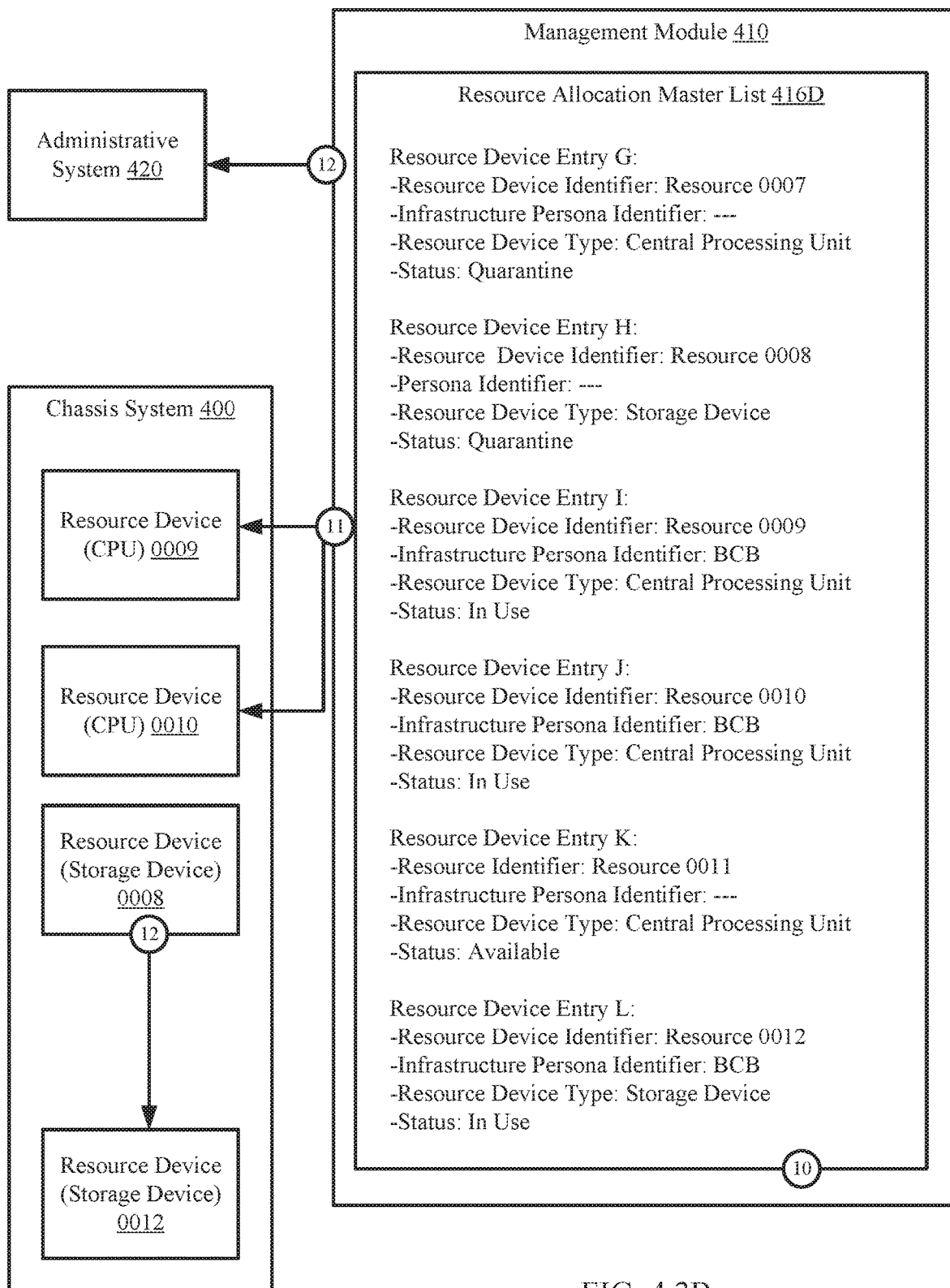
FIG. 4.3B

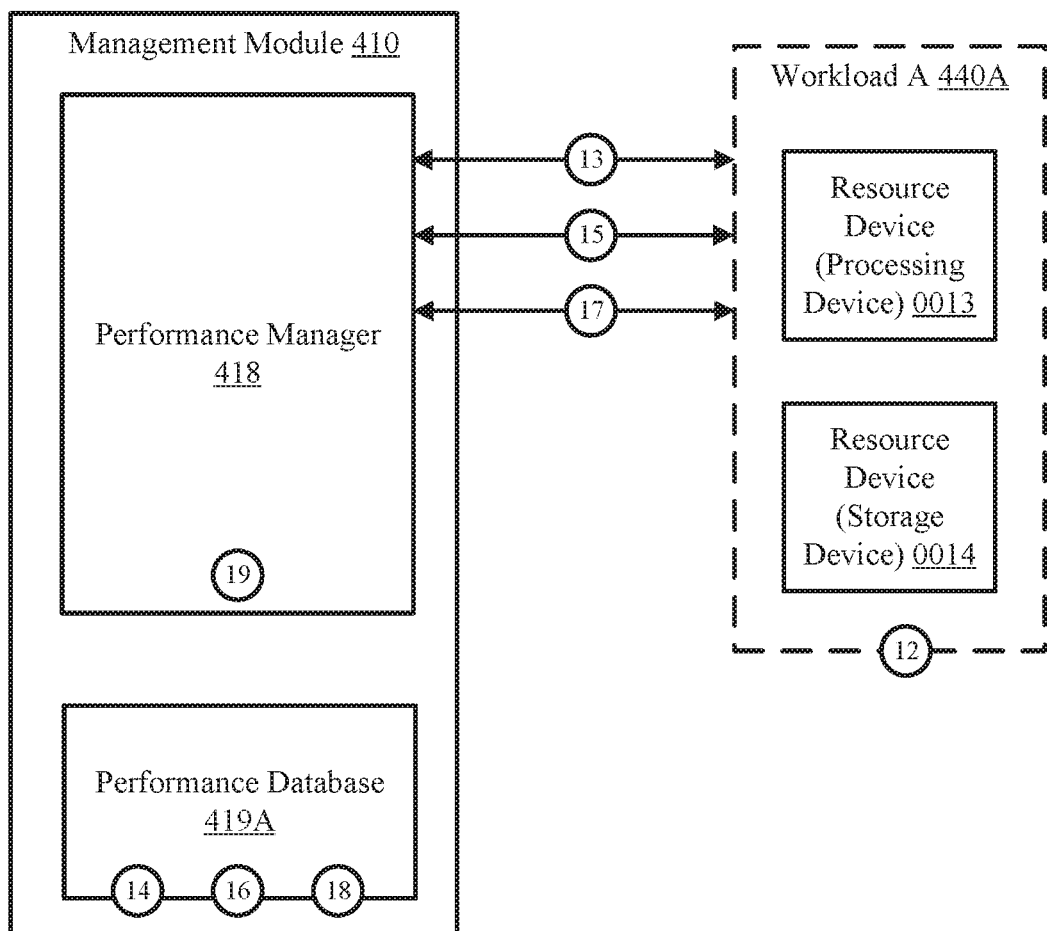
FIG. 4.4A

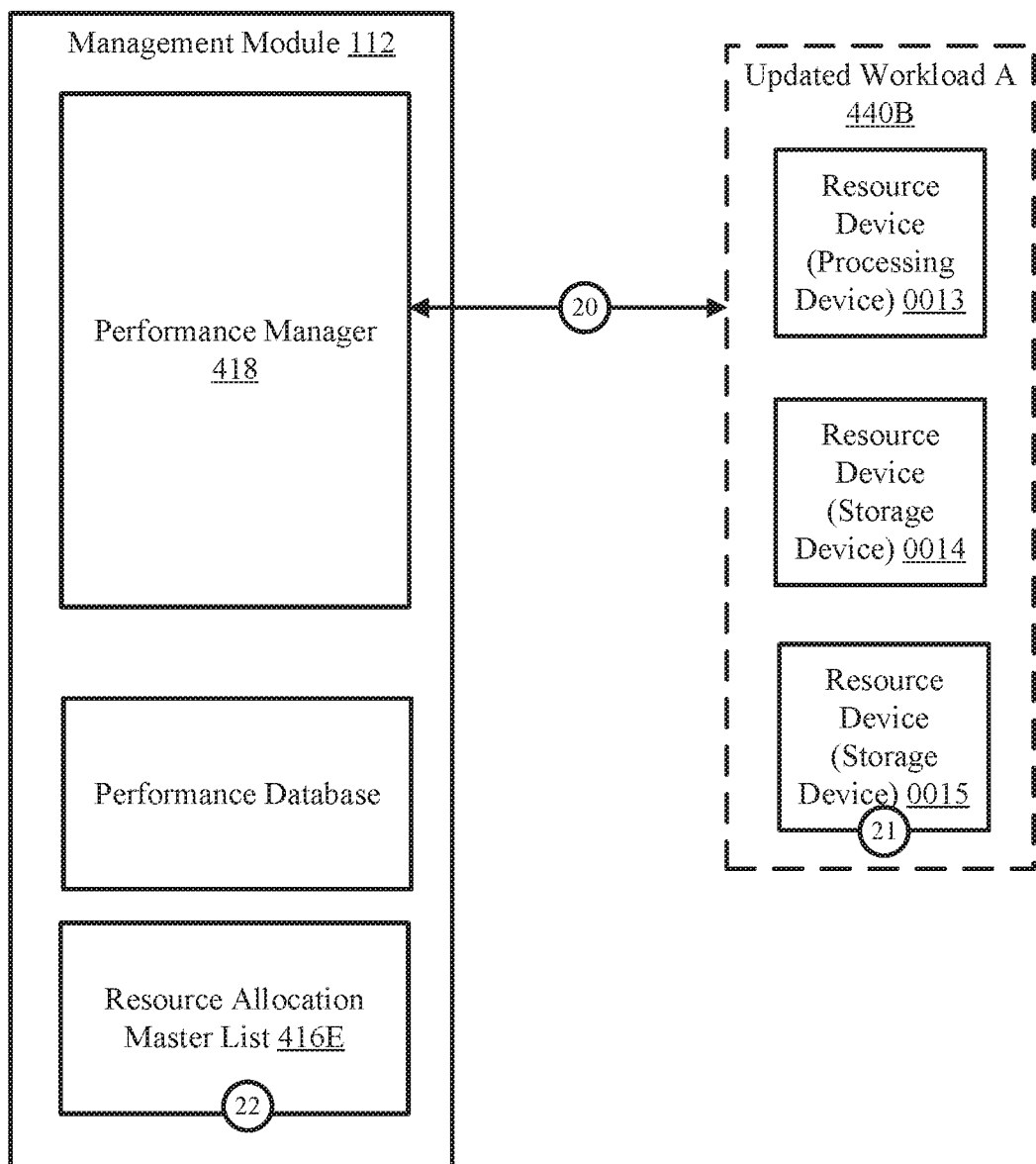
FIG. 4.4B

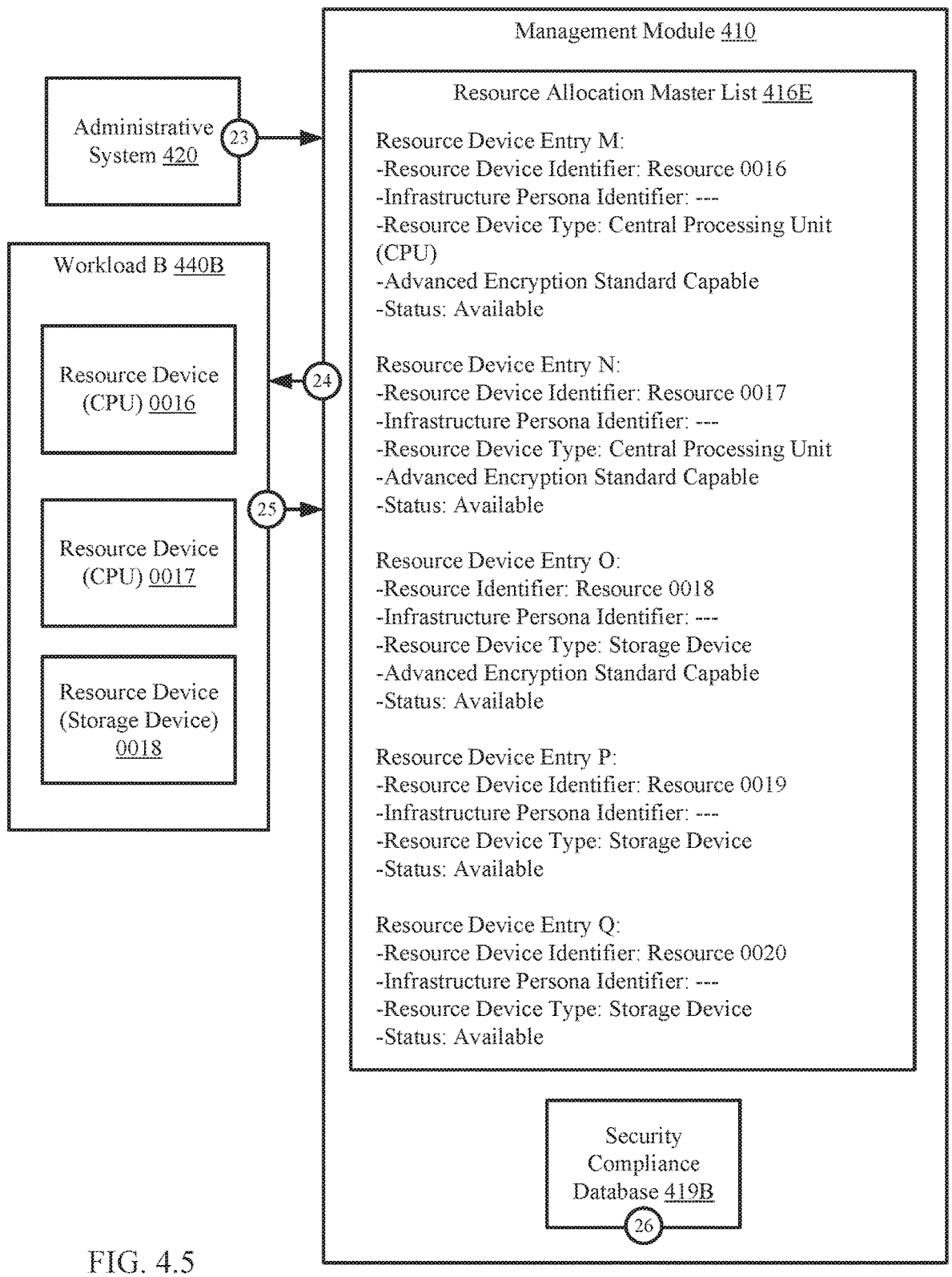
FIG. 4.5

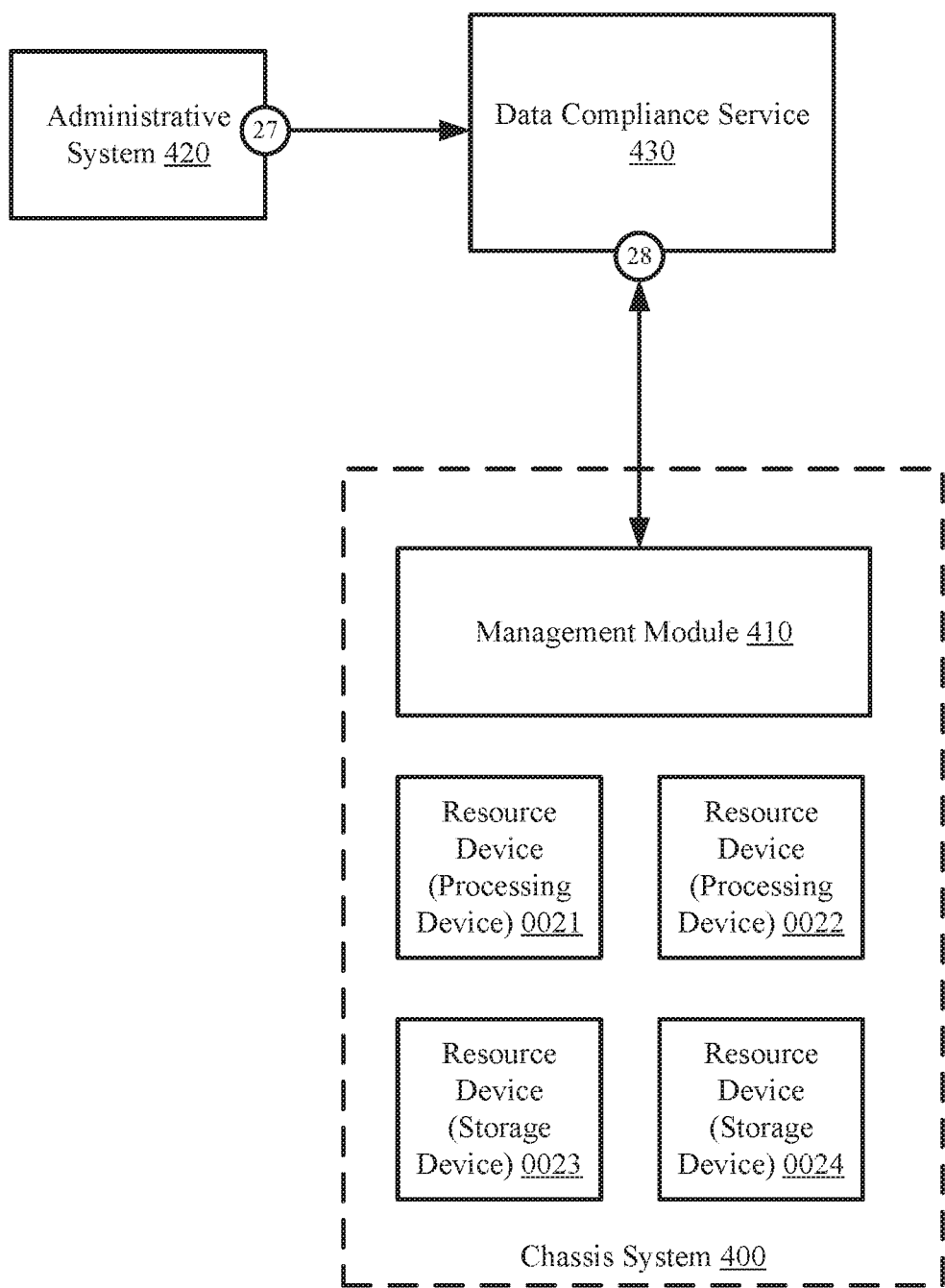
FIG. 4.6A

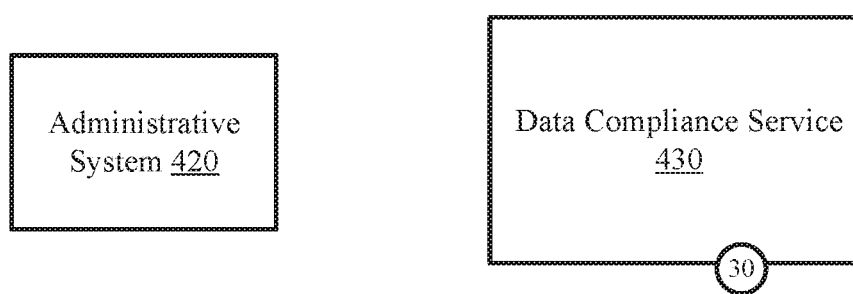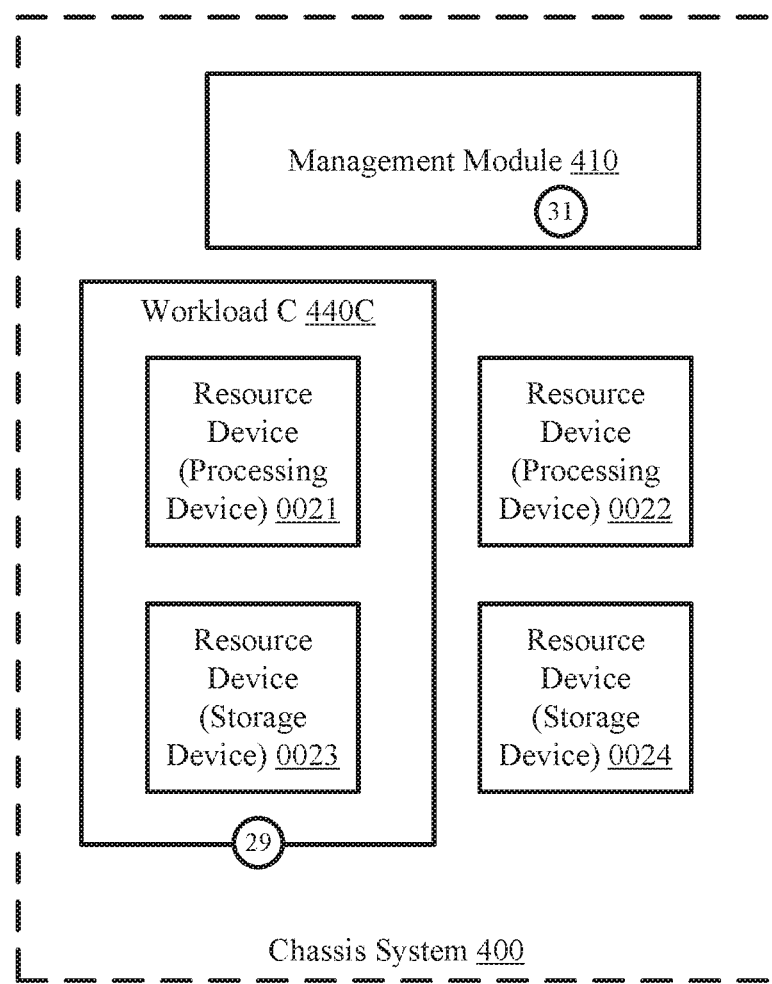
FIG. 4.6B

US 11,475,149 B2

METHOD AND SYSTEM FOR GENERATING A SECURITY-COMPLIANT WORKLOAD IN A COMPOSABLE INFRASTRUCTURE

BACKGROUND

Computing devices may include any number of internal components such as processors, memory, and persistent storage. Each of the internal components of a computing device may be used to generate data. The process of generating, storing, and transferring data may utilize resources of the computing devices such as processing and storage. The utilization of the aforementioned resources to generate, store, and transfer data may impact the overall performance of the resources.

SUMMARY

In general, in one aspect, the invention relates to a method for managing data. The method includes obtaining a workload generation request, wherein the workload generation request specifies a security compliant rule, in response to the workload generation request: selecting a first set of resource devices using a resource allocation master list, initiating a security compliance test on the first set of resource devices to obtain a security compliance result, making a first determination, based on the security compliance result, that the first set of resource devices meet a security compliance criterion, and in response to the first determination: storing a virtual certificate in a security compliance database based on the security compliance result, and allocating the first set of resource devices to a workload based on the workload generation request.

In general, in one aspect, the invention relates to a non-transitory computer readable medium that includes computer readable program code, which when executed by a computer processor enables the computer processor to perform a method for managing data. The method includes obtaining a workload generation request, wherein the workload generation request specifies a security compliant rule, in response to the workload generation request: selecting a first set of resource devices using a resource allocation master list, initiating a security compliance test on the first set of resource devices to obtain a security compliance result, making a first determination, based on the security compliance result, that the first set of resource devices meet a security compliance criterion, and in response to the first determination: storing a virtual certificate in a security compliance database based on the security compliance result, and allocating the first set of resource devices to a workload based on the workload generation request.

In general, in one aspect, the invention relates to a system that includes a processor and memory that includes instructions, which when executed by the processor perform a method for managing data. The method includes obtaining a workload generation request, wherein the workload generation request specifies a security compliant rule, in response to the workload generation request: selecting a first set of resource devices using a resource allocation master list, initiating a security compliance test on the first set of resource devices to obtain a security compliance result, making a first determination, based on the security compliance result, that the first set of resource devices meet a security compliance criterion, and in response to the first determination: storing a virtual certificate in a security compliance database based on the security compliance result, and allocating the first set of resource devices to a workload based on the workload generation request.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 4.1A-4.1B show an example in accordance with one or more embodiments of the invention.

FIGS. 4.2A-4.2B show a second example in accordance with one or more embodiments of the invention.

FIGS. 4.3A-4.3B show a third example in accordance with one or more embodiments of the invention.

FIGS. 4.4A-4.4B show a fourth example in accordance with one or more embodiments of the invention.

FIG. 4.5 shows a fifth example in accordance with one or more embodiments of the invention.

FIGS. 4.6A-4.6B show an example in accordance with one or more embodiments of the invention.

DETAILED DESCRIPTION

Figure 1A:
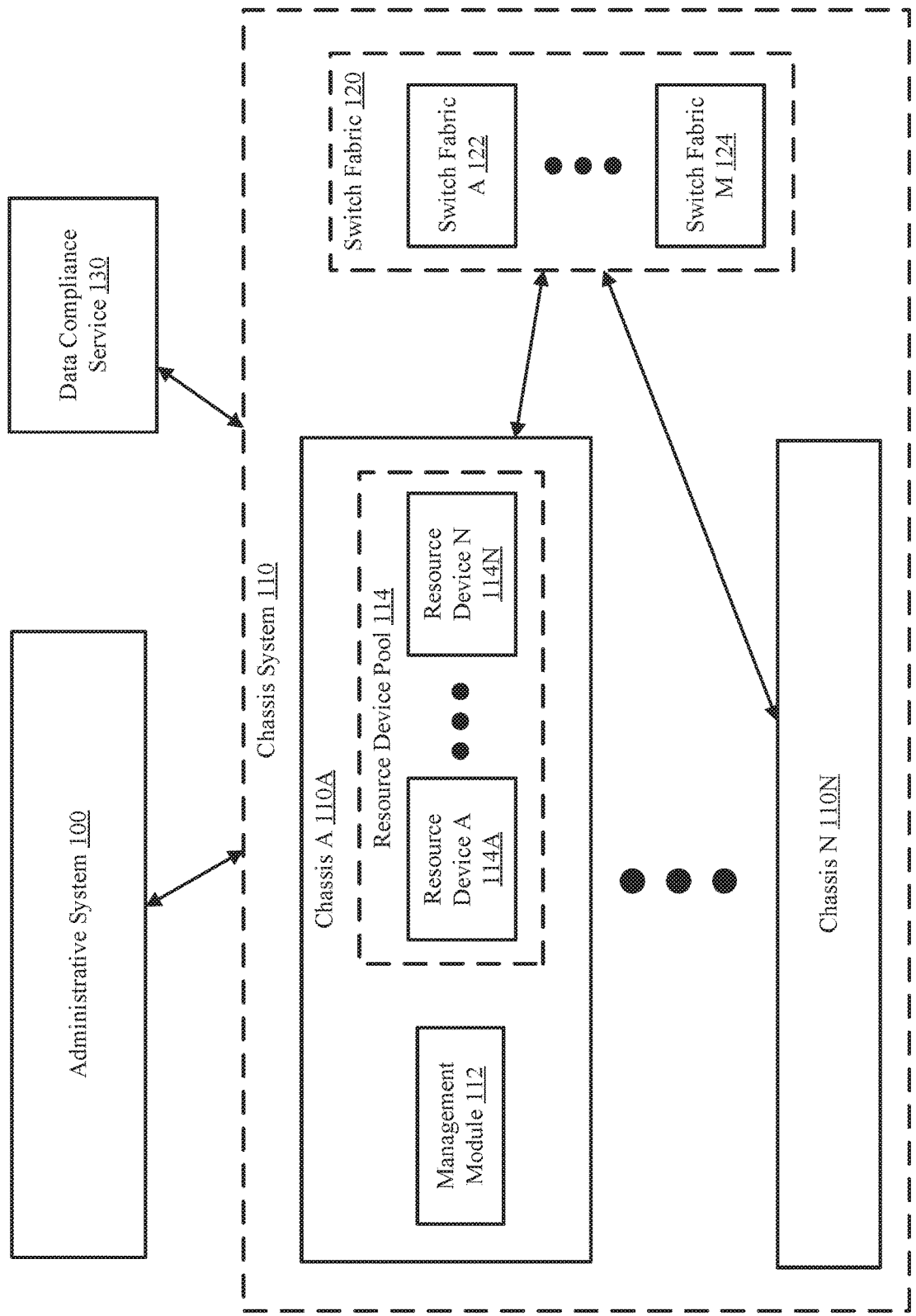
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N, A to P, A to M, or A to L. As used herein, the aforementioned labeling means that the element may include any number of items and does not require that the element include the same number of elements as any other item labeled as A to N, A to P, A to M, or A to L. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention may relate to a method and system for utilizing resource devices. Embodiments of the invention may include generating a workload associated with an infrastructure persona. The workload may utilize one or more resource devices. The generation of the workload may include identifying, using a resource allocation master list, available resource devices that may be allocated to the workload. The generation of the workload may further include specifying, in the resource allocation master list, the allocation of the previously-available resource devices to the workload.

Embodiments of the invention may include a method for performing latency management. Embodiments of the invention may further include monitoring resource devices associated for each switch fabric and identifying the latency cost between resource devices connected via one or more switch fabrics. The latency cost between resource devices may be determined and provided to an administrative system managing the workload generation. The administrative system may select the combination of resource devices with the lowest latency cost. Alternatively, the selection may be performed automatically based on the determined latency costs.

Embodiments of the invention may include a method for rebuilding a workload after a notification is obtained that one or more resource devices of the workload has failed. Embodiments of the invention may include updating a resource allocation master list to specify a failed status of the failed resource devices and reassigning reserved resource devices (e.g., such resource devices that are already allocated to the infrastructure persona of the workload and pre-configured to a similar configuration of the failed resource devices).

Embodiments of the invention may include performing a method for performing redeployment of workloads using available resource devices. The method may include identifying any resource devices needed for the new workload, identifying the resource devices available in the system, initiating any configuration of processing or networking devices, and, if needed, initiating a migration of data from old storage devices to the reallocated storage devices.

Embodiments of the invention may include a method for monitoring performance metrics of resource devices in a workload. The method may include obtaining performance metrics and determining whether the performance metrics of the resource devices indicate the workload meets standard performance. Embodiments of the invention may further include performing a remediation when the workload does not meet the standard performance. Snapshots may be obtained about current performance.

In one or more embodiments of the invention, the generated workload may be a security compliant workload. A security compliant workload may meet the criteria set by one or more security rules (e.g., encryption standards, specifying a source of resource device manufacturer, etc.). Embodiments of the invention may include identifying, of the available resource devices, those that meet the specified security rules and, after allocating resource devices to the security-compliant workload, a virtual certificate that specifies the security-compliant workload.

In one or more embodiments of the invention, the generated workload may be a data compliant workload. A security compliant workload may meet the criteria set by one or more data compliance rules (e g, limits to the location of physical storage devices, privacy regulation, etc.). Embodiments of the invention may include identifying, of the available resource devices, those that meet the specified data compliance rules and, after allocating resource devices to the data compliant workload, a ledger entry that specifies the workload and the data compliance rules that the workload is intended to follow. The ledger entry may be updated as new data compliance rules are introduced and the workload is updated to meet the new data compliance rules.

FIG. 1A shows an example system in accordance with one or more embodiments of the invention. The system includes an administrative system (100) a chassis system (110), and a data compliance service (130). The components in the system may be operably connected via any combination of wired and/or wireless connections. The system may include additional, fewer, and/or different components without departing from the invention. Each component in the system is operably connected via any combination of wired and/or wireless connections.

In one or more embodiments of the invention, the administrative system (100) utilizes the resource devices (e.g., 114A, 114N) of the chassis system (110) to implement workloads. The administrative system may send workload generation requests to a management module (112) of a chassis (110A, 110N) that specifies generation of a workload.

In one or more embodiments of the invention, a workload is an operation performed by one or more resource devices. Examples of workloads include, but are not limited to, executing a virtual cluster, a multi-node hyper-converged infrastructure, a database application, and a computing application. The type of workload implemented may impact the number and/or types of resource devices utilized by the workload. For example, a virtual cluster may utilize more resource devices than a database application.

In one or more embodiments of the invention, each workload is associated with an infrastructure persona. In one or more embodiments of the invention, an infrastructure persona is an entity that is allocated resource devices. The infrastructure persona may utilize any or all of the allocated resource devices to implement a workload. For additional details regarding an infrastructure persona, see, e.g., FIG. 1B.

Figure 5:
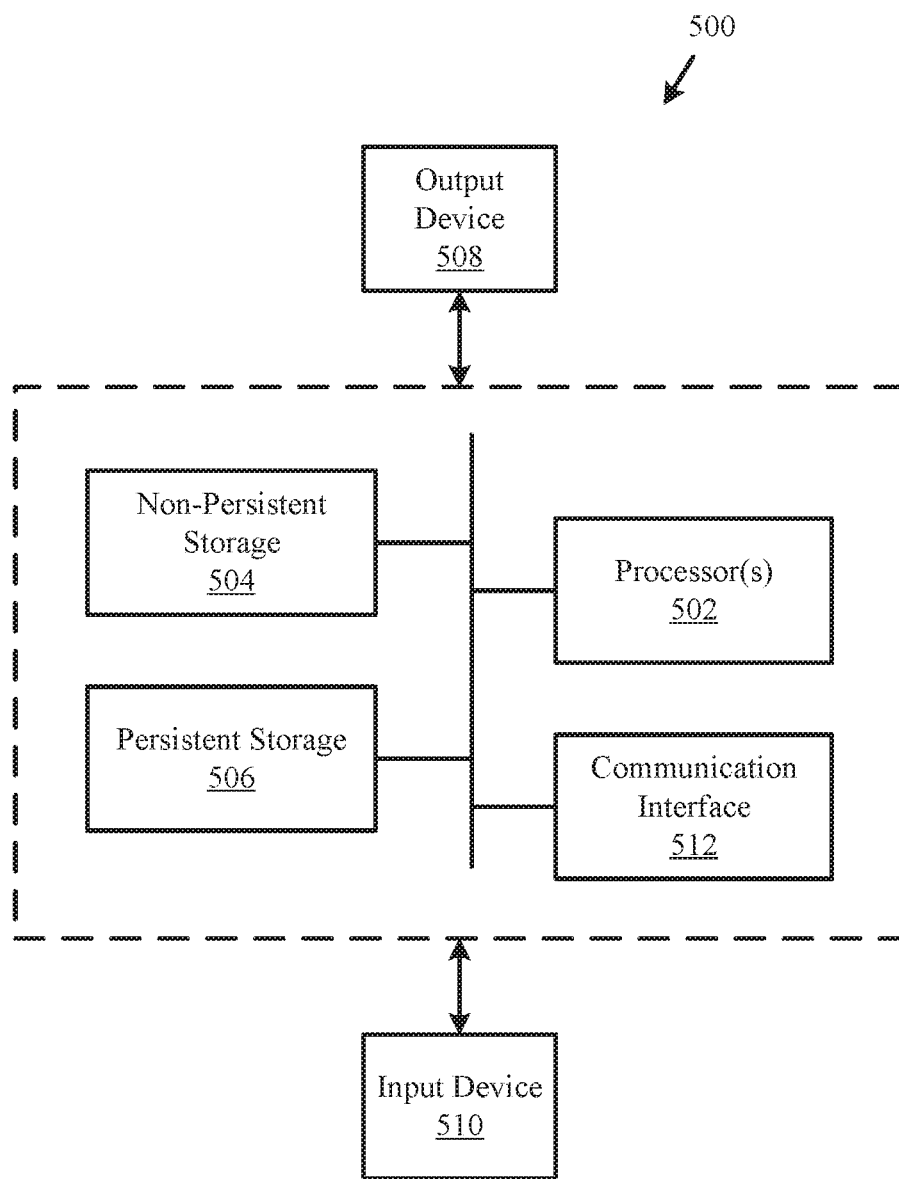
FIG. 5 shows a diagram of a computing device in accordance with one or more embodiments of the invention.

In one or more embodiments of the invention, the administrative system (100) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the administrative system (100) described throughout this application.

In one or more embodiments of the invention, the administrative system (100) is implemented as a logical device. The logical device may utilize the computing resources of any number of computing devices and thereby provide the functionality of the administrative system (100) described throughout this application.

The chassis system (110) may include one or more chassis (110A, 110N). In one or more embodiments of the invention, a chassis is a housing mechanism that houses a resource device pool (114). A resource device pool (e.g., 114) may include one or more resource devices (114A, 114N). Each chassis (110A, 110N) further includes a management module (e.g., 112) that enables the generation, modification, and/or implementation of the workloads. Each resource device (e.g., 114A, 114N) in the chassis system (110) may be allocated to an infrastructure persona to be used to implement a workload. For additional details regarding a resource device (e.g., 114A, 114N), see, e.g., FIG. 1C.

In one or more embodiments of the invention, the resource devices in the resource device pools (e.g., 114) of the chassis system (110) collectively make up a composable infrastructure. In one or more embodiments of the invention, a composable infrastructure is a collection of resource devices that may be distributed among infrastructure personas (discussed in FIG. 1B) to be utilized to implement workloads. The resource devices may be shared between the infrastructure personas to implement workloads. The resource devices (e.g., 114A, 114N) may be enabled to implement a workload for one infrastructure persona with one set of resource devices at one point in time and a different workload for a different infrastructure persona with a different set of resource devices at a second point in time. In this manner, each resource device in the composable infrastructure is not limited to operate with any one set of resource devices, nor is it limited to implement one workload. The allocation of resource devices to the workloads and/or infrastructure personas in the composable infrastructure may be managed by the management module (112). In one or more embodiments of the invention, the resource devices in the composable infrastructure may be external to the chassis system (100). In such embodiments, the resource devices may be connected to the switch fabrics (120) via any other connections independent from the structure of a chassis (e.g., 110A, 110N).

In one or more embodiments of the invention, the management module (112) manages the usage of the resource devices in the resource device pool (114). Specifically, the management module may include functionality for generating, deploying, and/or modifying workloads utilized by an infrastructure persona in accordance with any or all of the methods illustrated in FIGS. 3A-3F. The management module (112) may be internal or external to a chassis (110A, 110N) without departing from the invention. In such embodiments where the management module is internal to each chassis (110A, 110N), the information of each management module (e.g., 112) may be propagated to any or all management modules in the chassis system (110). In this manner, each management module (e.g., 112) in the chassis system (110) is consistent, and any management module is capable of performing the functionality of the management module (112) described throughout this application and/or all or a portion of the methods illustrated in FIGS. 3A-3F.

In one or more embodiments of the invention, the management module (112) is implemented as computing code stored on a persistent storage that when executed by a processor of a computing device performs the functionality of the management module (112) discussed throughout this application and/or all or a portion of the methods illustrated in FIGS. 3A-3F. The processor may be a hardware processor including circuitry such as, for example, a central processing unit (CPU) or a microcontroller. The processor may be other types of hardware devices for processing digital information without departing from the invention. For additional details regarding the management module, see, e.g., FIG. 1D.

The chassis system may further include any number of switch fabrics (120). The switch fabrics (122, 124) may each be devices that enable communication between resource devices in the chassis system (110). Each switch fabric (e.g., 122, 124) may include any number of switches that connect two or more resource devices (e.g., 114A, 114N) within the chassis system (110). Each of the resource devices connected to a switch fabric (122, 124) may be associated with the same or a different chassis (e.g., 110A, 110N) without departing from the invention.

In one or more embodiments of the invention, a switch fabric (122, 124) is implemented as a series of crossbar switches. A crossbar switch may be a collection of network switches with multiple inputs and multiple outputs. The collection of network switches may be interconnected via any combination of wired and/or wireless connections arranged in, for example, in a matrix configuration, where each input is connected to all or a portion of the outputs in the collection of network switches. The switch fabric (122, 124) may be implemented as any other known or later discovered network component without departing from the invention.

In one or more embodiments of the invention, the communication between resource devices in a switch fabric (122, 124) may produce negligible latency. In other words, one may estimate near-zero latency between resource devices communicating within one switch fabric.

In contrast, communication between two or more resource devices each in a different switch fabric may have a measurable amount of latency. The amount of latency may increase with the number of switch fabrics needed for the two resource devices to communicate.

For example, consider a series of switch fabrics identified as switch fabrics A, B, C, and D. The direct connections between switch fabrics may be as follows: switch fabric A is directly connected to switch fabric B, which is also directly connected to switch fabric C, which is also directly connected to switch fabric D.

Continuing the above example, a resource device pool may be directly connected to each switch fabric. A first resource device directly connected to switch fabric A may communicate with a second resource device connected to switch fabric B and a third resource device connected to switch fabric D. The latency in communication between the first and second resource device may be lower than the latency in communication between the first and the third resource devices because there are less switch fabrics needed to communicate between the first and second resource device than between the first and third resource device.

In one or more embodiments of the invention, the latency between resource devices may be measured using, for example, units of latency. In one or more embodiments of the invention, a unit of latency may correspond to the number of switch fabrics required for the resource devices to communicate.

For example, the latency between the first and second resource devices discussed above may be associated with one unit of latency, because switch fabrics A and B are directly connected, and the first resource device needs to utilize switch fabric B to communicate with the second resource device. As a second example, the first and third resource devices may be associated with two units of latency due to the first resource device needing to use switch fabrics B and C to communicate with the third resource device.

In one or more embodiments of the invention, the data compliance service (130) manages data compliant workloads. Specifically, the data compliance service (130) initiates generation of workloads that comply with one or more data compliant rules. The data compliance service (130) may generate data compliance certificates for data compliant workloads and store immutable ledger entries that specify the data compliant workloads, the data compliance certificate, and/or the resource devices used to implement the workload.

In one or more embodiments of the invention, the data compliance service (130) is implemented as a computing device (see, e.g., FIG. 5). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the data compliance service (130) described throughout this application.

In one or more embodiments of the invention, the data compliance service (130) is implemented as a logical device. The logical device may utilize computing resources of any number of physical computing devices to provide the functionality of the ledger service (134) described throughout this application.

In one or more embodiments of the invention, the data compliance service (130) is implemented as a distributed ledger (e.g., a block chain). The logical device may utilize computing resources of any number of physical computing devices to provide the functionality of the data compliance service (130) described throughout this application.

Figure 1B:
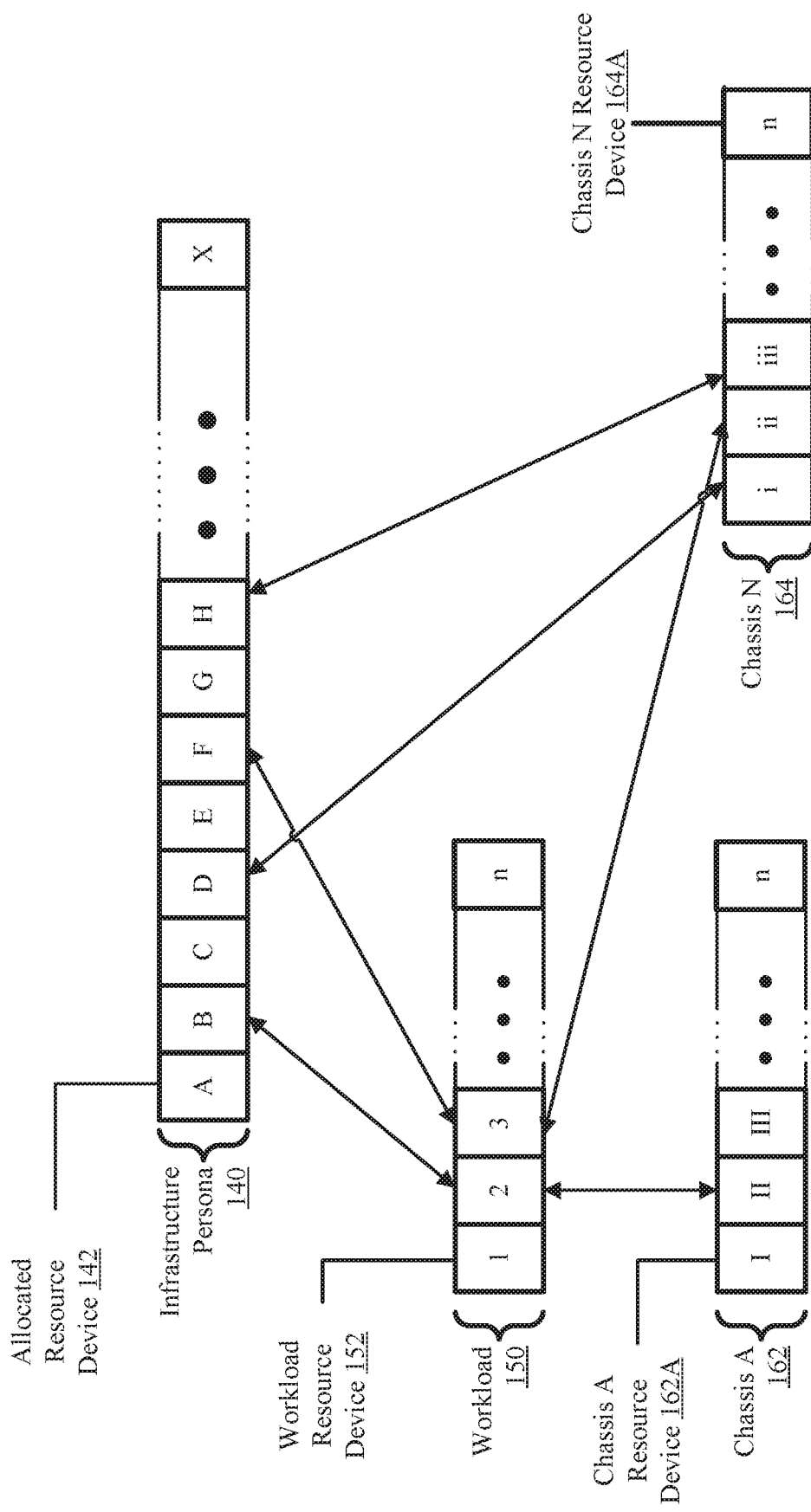
FIG. 1B shows a diagram of an infrastructure persona in accordance with one or more embodiments of the invention.

FIG. 1B shows a diagram of an infrastructure persona. The infrastructure persona (140) is a logical entity that is allocated one or more resource devices (e.g., 142). The infrastructure persona (140) may implement a workload (150) using one or more allocated resource devices. The allocated resource device(s) used to implement the workload (also referred to as a workload resource device) may be obtained from one or more chassis (162, 164). In other words, each workload resource device (e.g., 152) may be a chassis resource device (e.g., 162A, 164A).

In one or more embodiments of the invention, the infrastructure persona (140) is generated in accordance with an administrative system. The administrative system may determine the types of resource devices (e.g., 142) to be allocated to the infrastructure persona (140) based on a workload (150) to be implemented using the infrastructure persona. While all workload resource devices (e.g., 152) are associated with an allocated resource device (e.g., 142) of the infrastructure persona (140), not all allocated resource devices (e.g., 142) are associated with the workload (150). In other words, one or more allocated resource devices (e.g., 142) may be on standby and not utilized by the infrastructure persona (140) to implement the workload (150).

In one or more embodiments of the invention, the workload resource devices (e.g., 152) are obtained from one or more chassis (162, 164). Said another way, the workload resource devices (e.g., 152) of the workload (150) may not all be associated with the same chassis (e.g., 162).

In one or more embodiments of the invention, the workload resource devices (152) executing a workload (150) may change throughout the lifecycle of the workload (150). In other words, workload resource devices of a workload (150) may be added, removed, and/or modified (e.g., to vary the chassis resource devices associated with the resource devices).

Figure 1C:
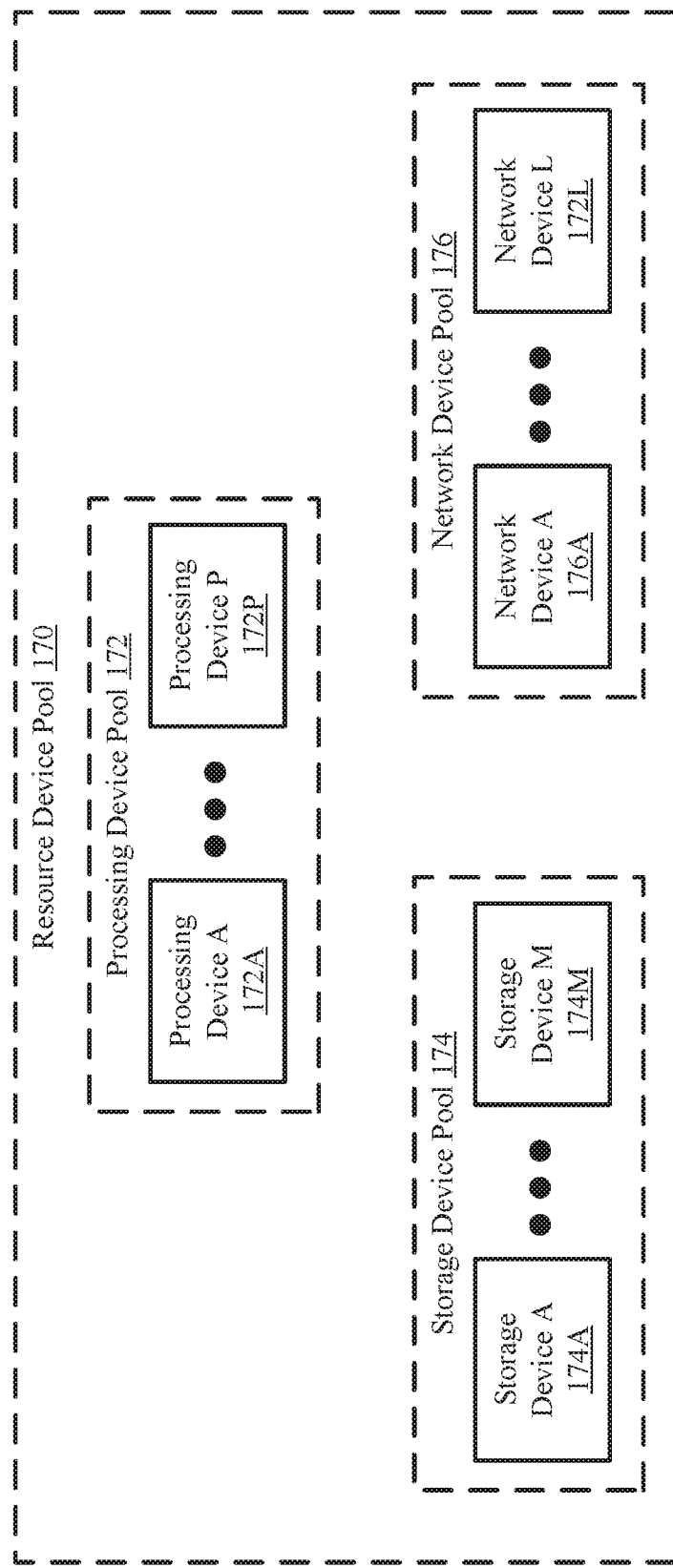
FIG. 1C shows a diagram of a resource device pool in accordance with one or more embodiments of the invention.

FIG. 1C shows a diagram of a resource device pool (170). The resource device pool (170) may be an embodiment of the resource device pool (114, FIG. 1A) discussed above. The resource device pool (170) may include any combination of a processing device pool (172), a storage device pool (174) and a network device pool (176). The resource device pool (170) may include other types of resource device pools (e.g., different from a processing device pool, a network device pool, or a storage device pool) without departing from the invention.

In one or more embodiments of the invention, the processing device pool (172) includes one or more processing devices (172A, 172P). Each processing device (172A, 172P) may be a device that is capable of performing computing operations. Each processing device (172A, 172P) may include one or more processing cores, cache, memory, and/or other components that enable the processing device (172A, 172P) to perform the aforementioned computing operations. Examples of processing devices include, but are not limited to, single-core CPUs, multi-core CPUs, graphics processing units (GPUs), and field programmable gate arrays (FPGAs).

In one or more embodiments of the invention, the storage device pool (174) includes one or more storage devices (174A, 174M). Each storage device (174A, 174M) may be (or include) non-volatile storage. In other words, the data stored in the storage devices (174A, 174M) does not get lost or removed when the storage devices (174A, 174M) lose power. Each of the storage devices (174A, 174M) may be (or include), for example, one or more solid state drives, hard disk drives, tape drives, and/or non-volatile memory (e.g., persistent memory). The storage devices may include other types of non-volatile or non-transitory storage mediums without departing from the invention.

In one or more embodiments of the invention, the network device pool (176) includes one or more network device (176A, 176L). Each network device may be a device that enables communication between one or more resource device in one or more resource device pools (e.g., 170). The network device may include for example, a network interface controller (NIC), a network switch, etc. The network device(s) in a workload may allow each resource device to communicate with other resource devices in a workload for the purpose of, for example, obtaining data from the resource devices.

Figure 1D:
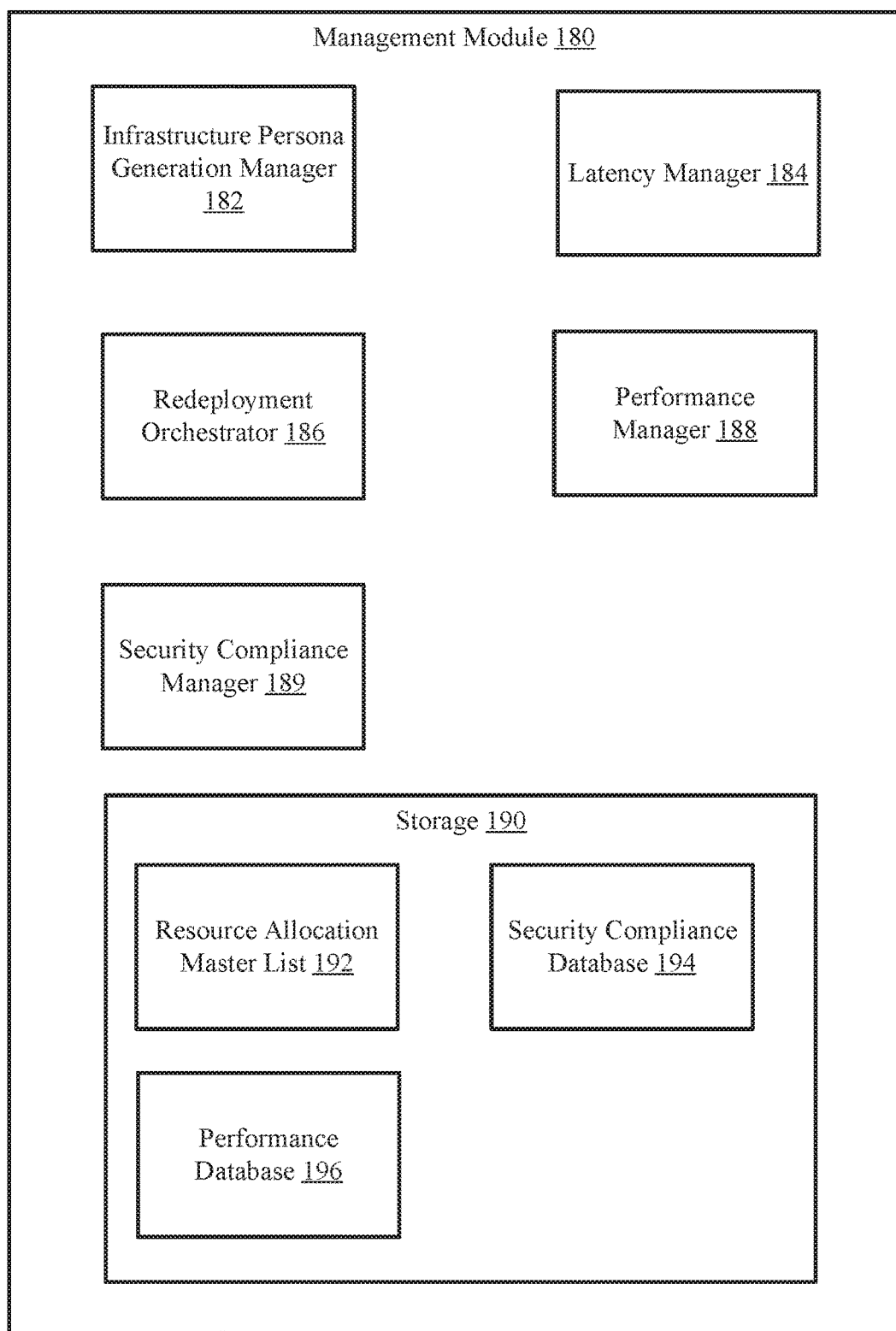
FIG. 1D shows a diagram of a management module in accordance with one or more embodiments of the invention.

FIG. 1D shows a diagram of a management module. The management module (180) of FIG. 1D may be an embodiment of a management module (e.g., 112, FIG. 1A) discussed above. The management module (180) may include an infrastructure persona generation manager (182), a latency manager (184), a redeployment orchestrator (186), a performance manager (188), a security compliance manager (189), and storage (190). The management module (180) may include additional, fewer, and/or different components without departing from the invention. The storage may store a resource allocation master list (192), a security compliance database (194), and a performance database (196). The storage (190) may store additional, fewer, and/or different data structures without departing from the invention.

In one or more embodiments of the invention, the infrastructure persona generation manager (182) generates infrastructure personas and/or workloads associated with the infrastructure personas. The infrastructure persona generation manager (182) may generate an infrastructure persona in accordance with a request obtained from an administrative system that specifies the infrastructure persona to be generated. The infrastructure persona generation manager may generate the infrastructure persona by generating an infrastructure persona identifier (ID), allocating one or more resource devices to the infrastructure persona, performing any configuration on the resource devices (e.g., operating system installation, network connectivity settings, etc.) on the resource devices that enable the infrastructure persona to implement a workload, and updating the resource allocation master list (192) based on the allocation.

Further, the infrastructure persona generation manager (182) may service workload generation requests obtained from an administrative system that specifies generating a workload associated with an infrastructure persona. The infrastructure persona generation manager (182) may service the workload generation requests in accordance with FIGS. 3A, 3E, and/or 3F.

Figure 3A:
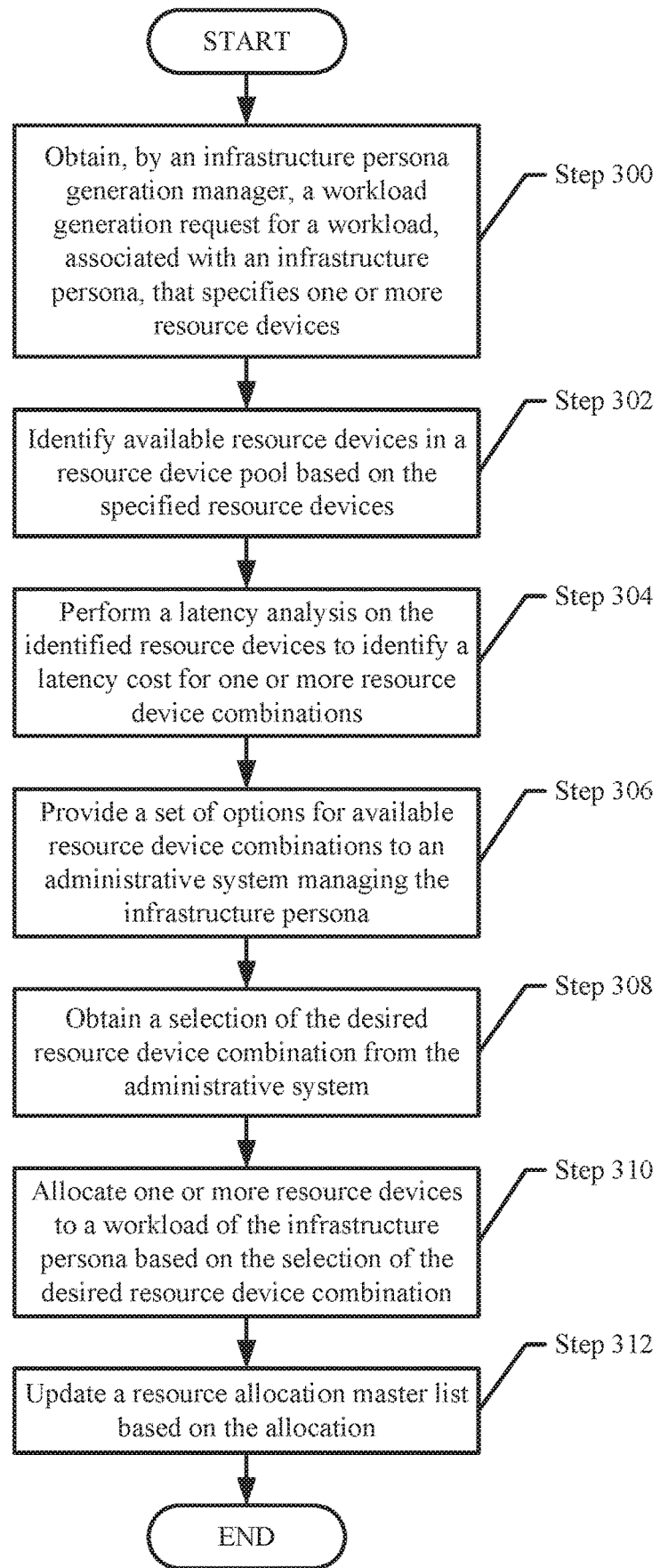
FIG. 3A shows a flowchart for generating a workload for an infrastructure persona in accordance with one or more embodiments of the invention.
Figure 3B:
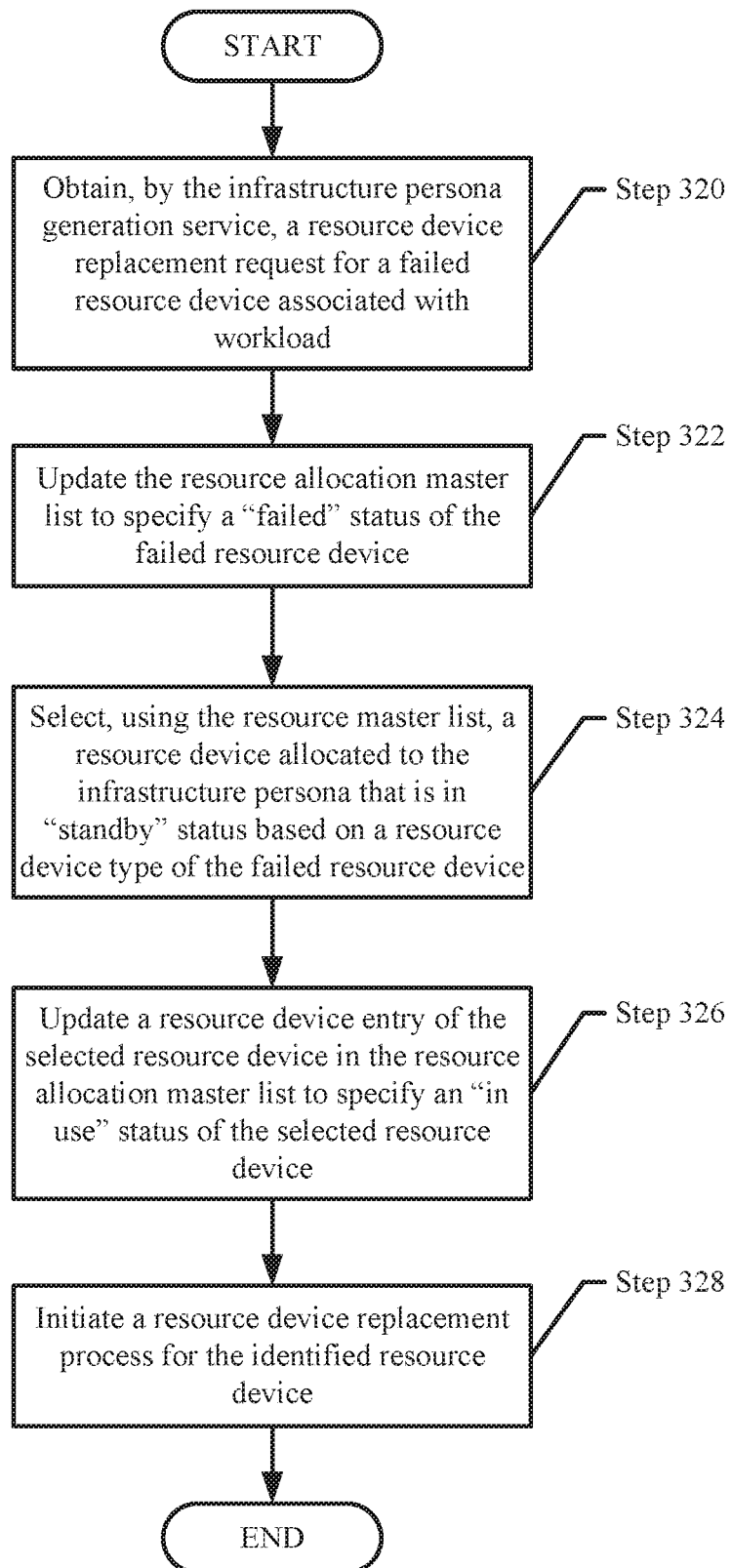
FIG. 3B shows a flowchart for replacing a failed resource device in accordance with one or more embodiments of the invention.

In one or more embodiments of the invention, the infrastructure persona generation manager (182) further includes functionality to update and/or otherwise modify an existing workload in accordance with the method illustrated in FIG. 3B.

In one or more embodiments of the invention, the latency manager (184) monitors the latency cost of communication between the resource devices in the chassis system. The latency manager (184) may store a table that specifies each switch fabric in the chassis system, and the resource devices stored in each switch fabric. The latency manager (184) may use the table to identify a latency cost between two or more resource devices in response to requests by the administrative system to identify a latency cost between the resource devices. The latency cost may be used to determine a resource device combination to be used when generating a workload. The latency manager (184) may perform the aforementioned functionality in accordance with all or a portion of the method illustrated in FIG. 3A.

In one or more embodiments of the invention, the redeployment orchestrator (186) initiates redeployment of one or more existing workloads. The redeployment may be in response to, for example, a redeployment request issued by an administrative system to redeploy the workload and/or in response to a notification by the performance manager (188) that specifies a low performance by the workload. The redeployment may be initiated in accordance with the method illustrated in FIG. 3C.

In one or more embodiments of the invention, the performance manager (188) manages the performance of resource devices utilized by workloads. The performance manager (188) may monitor the resource devices to obtain performance metrics, compare the performance metrics to performance criteria, and, if the performance metrics do not satisfy the performance criteria, the performance manager (188) may initiate a remediation based on such determination. The performance metrics and the performance criteria may be stored in a performance database (196). The performance manager may manage the performance of the resource devices in accordance with the method illustrated in FIG. 3D.

In one or more embodiments of the invention, the security compliance manager (189) manages the security compliance of workloads. The security compliance manager (189) may manage the security compliance by maintaining security compliance database (194) that stores virtual certificates for workloads that are security compliant of one or more security compliance rules (discussed below in FIG. 3E). The security compliance manager may initiate the generation of security compliant workloads in accordance with FIG. 3E.

In one or more embodiments of the invention, the storage (190) stores a resource allocation master list (192), a security compliance database (194), and a performance database (196). The storage (190) may store additional, fewer, and/or different data structures without departing from the invention. The storage (190) may be volatile or non-volatile without departing from the invention.

In one or more embodiments of the invention, the resource allocation master list (192) is a data structure that specifies information about each resource device in the composable infrastructure. The information may include, for example, whether the resource device is utilized by an infrastructure persona to implement a workload, a status of the resource device (discussed below in FIG. 2), and/or other information about the resource devices that may be used by the infrastructure persona generation manager (182) when generating a workload and/or when allocating resource devices to an infrastructure persona. For additional details regarding the resource allocation master list (192), see, e.g., FIG. 2.

In one or more embodiments of the invention, the security compliance database (194) stores entries that each specify a workload and/or any virtual certification applied to the workload. The entries in the security compliance database (194) may be accessed by a user operating the administrative system to identify any workloads that are security compliant of one or more security compliant rules. The security compliant rules may be specified in the corresponding entries. Further, the entries in the security compliance database (194) may specify an encryption algorithm that each processing device in the composable infrastructure is equipped to perform. This information may be used to determine whether the processing device(s) are compliant with security compliant rules (discussed in FIG. 3E).

In one or more embodiments of the invention, the performance database (196) stores snapshots of performance metrics (discussed in FIG. 3D) of workloads in the composable infrastructure. In one or more embodiments of the invention, a performance metric is a measurable aspect of a resource device that specify how the resource device is being utilized at a given point in time. Examples of performance metrics include, but are not limited to: CPU utilization (e.g., as a percentage of total CPU capability), memory utilization, storage usage (e.g., as a percentage of storage capacity), network throughput, data transfer latency, and/or number of processing commands on a queue. Each of the performance metrics is obtained by measuring the usage of each of the resource devices in the workload.

Figure 2:
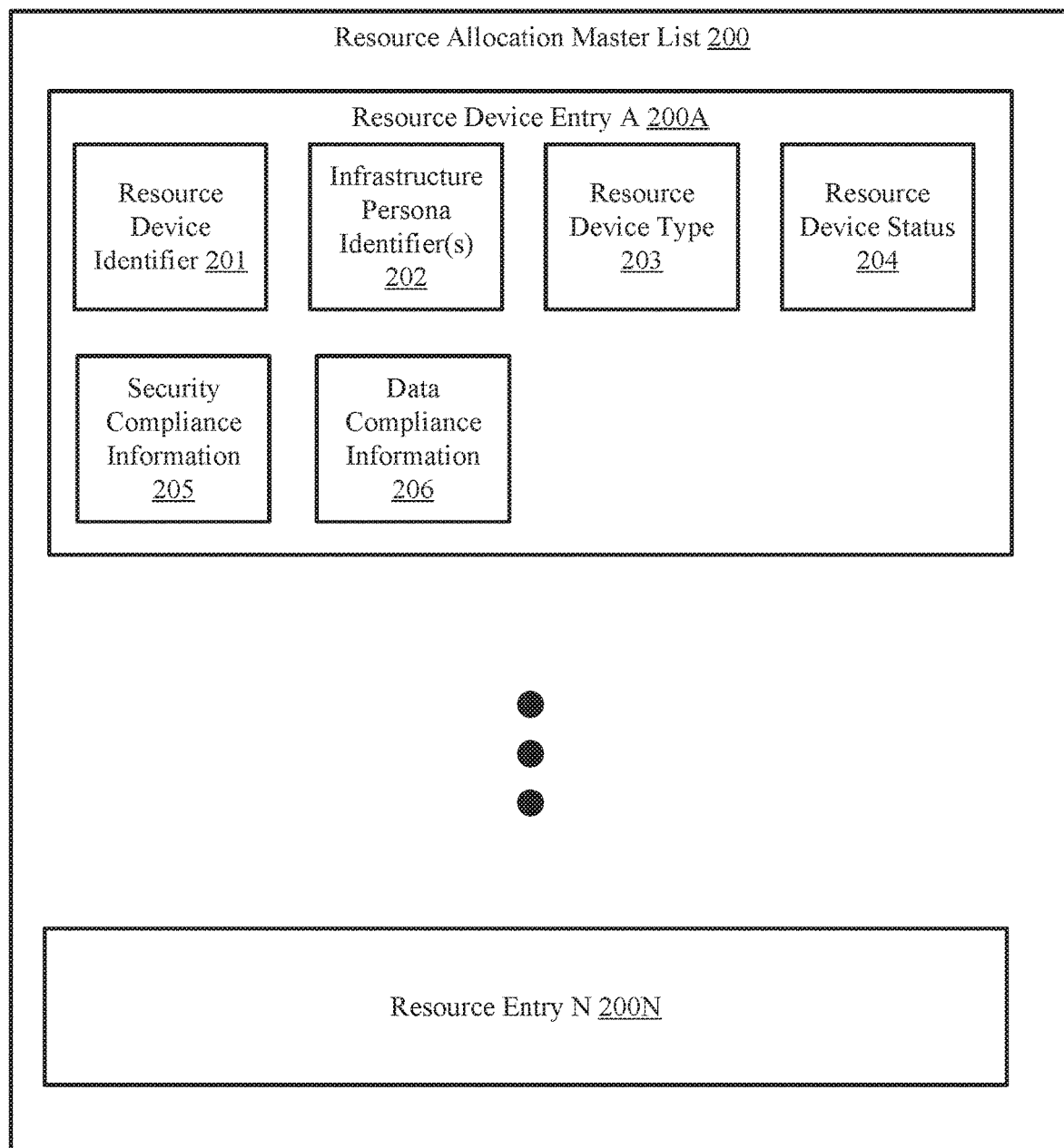
FIG. 2 shows a diagram of a resource allocation master list in accordance with one or more embodiments of the invention.

FIG. 2 shows a diagram of a resource allocation master list (200). The resource allocation master list may include resource device entries (200A, 200N). Each resource device entry (200A, 200N) may include an allocated resource device identifier (201), an infrastructure persona identifier (202), a resource device type (203), a resource device status (204), security compliance information (205), and data compliance information (206).

In one or more embodiments of the invention, the resource identifier (201) is a combination of letters, numbers, and/or symbols that uniquely identify a resource device associated with the resource device entry.

In one or more embodiments of the invention, the infrastructure persona identifier (202) is a combination of letters, numbers, and/or symbols that uniquely identify an infrastructure persona (if any) that the resource device is allocated to. If the resource device is in a "shared" status, the infrastructure person identifier (202) may specify multiple infrastructure personas to which the resource device is allocated to. For example, if the resource device is a storage device, the storage device may include multiple drives (e.g., hard disk drives, solid state drives, etc.) that are each allocated to an infrastructure persona. Such infrastructure persona(s) may be specified in the infrastructure persona identifier (202).

In one or more embodiments of the invention, if the resource device is being used to implement a workload, the resource device entry may further include a workload identifier. The workload identifier may be a combination of letters, numbers, and/or symbols that uniquely identify a workload. The workload identifier may be generated when the resource device is assigned to implement a workload.

In one or more embodiments of the invention, the resource device type (203) specifies the type of resource device of the resource device. For example, the resource device may be a processing device, a storage device, a network device, and/or any other known or later discovered type of resource device. Further, the resource device type (203) may provide more granular information about the type of resource. For example, if the resource device is a processing device, the resource device type (203) may specify whether the resource device is a CPU or a GPU.

In one or more embodiments of the invention, the resource device status (204) specifies the status of the resource device. Examples of resource device statuses include, but are not limited to: "available," "in use," "standby," "failed," "quarantine," and "shared."

A resource device with an "available" status may specify a resource device that is available to use by any infrastructure persona in the composable infrastructure. A resource device with an "in use" status may specify a resource device that is allocated to an infrastructure persona and is being used to implement a workload. A resource device with a "standby" status may specify a resource device that is allocated to an infrastructure person and is not being used to implement a workload. Alternatively, a resource device in a "standby" status may specify a resource device that may be used by any infrastructure persona in the composable infrastructure and is equipped to implement a specified list of workloads. A resource device with a "failed" status may specify a resource device that does not perform its expected functionality and is not available to use for any other workload. A resource device with a "quarantine" status may specify a resource device that was once used to implement a workload that has been redeployed and needs to be monitored and/or remedied. A resource device with the "quarantine" status may not be available for use to implement a workload. A resource device with a "shared" status may specify a resource device that is shared by more than one infrastructure persona to implement one or more workloads.

In one or more embodiments of the invention, the security compliance information (205) specifies the type of encryption that the resource device is equipped to perform. In one or more embodiments of the invention, an encryption algorithm is an operation performed on data that encodes the data and is intended to be deciphered using a decryption key (or via other authorized mechanism).

For example, the security compliance information (205) may specify that a processing device is capable of performing an encryption algorithm (e.g., Data Encryption Standard (DES), TripleDES, Rive-Shamir-Adleman (RSA), Advanced Encryption Standard (AES), etc.).

In one or more embodiments of the invention, the data compliance information (206) is information utilized to determine the compliance of the resource devices to one or more data compliance rules. The data compliance information (206) may specify, for example, a geographical location in which the corresponding resource device is located, whether the resource device is equipped to perform a mechanism for tracking the transfer and/or usage of data that maintains the privacy of the data, and/or any other information that specifies whether the resource device is able to comply with one or more data compliance rules. The geographical location may be specified by an administrative system managing the resource devices of a composable infrastructure. Any of the information specified in the data compliance information (206) (e.g., the geographical information and/or the data usage) may be automatically generated (e.g., via monitoring its global positioning system (GPS) location) and/or manually input by the administrative system without departing from the invention.

In one or more embodiments of the invention, the data compliance information (206) further includes a data compliance certificate. A data compliance certificate may be a data structure generated by a data compliance service that specifies that the resource device (and/or other resource devices implementing a workload) has been used to implement a workload that complies with one or more data compliance rules. For additional details regarding the data compliance rules, see, e.g., FIG. 3F.

FIG. 3A shows a flowchart for generating a workload for an infrastructure persona in accordance with one or more embodiments of the invention. The method shown in FIG. 3A may be performed by, for example, an infrastructure persona generation manager (182, FIG. 1D). Other components of the system illustrated in FIGS. 1A-1D may perform the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 300, a workload generation request is obtained. The workload generation request may specify one or more resource devices to be utilized by the workload. Further, the workload generation request may specify a minimum latency cost to be associated with the workload. In one or more embodiments of the invention, the workload is associated with a previously-generated infrastructure persona.

Alternatively, the workload is not associated with an infrastructure persona, and, as such, an infrastructure persona may be generated prior to generating the workload. In such embodiments, the infrastructure persona is generated by generating an infrastructure persona ID and storing the infrastructure persona ID in the resource allocation master list.

In step 302, available resources in one or more resource device pools in a composable infrastructure are identified based on the specified resource devices in the workload generation request. In one or more embodiments of the invention, the management module may analyze the resource allocation master list to identify the resource devices that are available (e.g., shared with the infrastructure persona and/or not allocated to another infrastructure persona). From the available resource devices, the types of resource devices requested for the workload is identified. For example, if the workload generation request specifies two processing devices and one storage device, the management module may identify, of the available resource devices, those that are processing devices or storage devices.

In step 304, a latency analysis is performed on the identified resource devices to identify a latency cost of one or more resource device combinations. In one or more embodiments of the invention, a resource device combination is a unique grouping of resource devices that includes all resource device requested in the workload generation request. The latency analysis includes identifying the resource device combinations and calculating a total latency cost for each resource device combination.

For example, for the workload generation that specifies two processing devices and one storage device, one resource device combination may include processing device A, processing device B, and storage device C. A second resource device combination may include processing device A, processing device D, and storage device C. A third resource device combination may include processing device E, processing device F, and storage device G.

In one or more embodiments of the invention, after the resource device combinations are identified, a total latency cost for each resource device combination is calculated. In one or more embodiments of the invention, the total latency cost is calculated by performing a function (e.g., summation) on latency costs between each pair of resource devices in the resource device combination. Each latency cost is identified by identifying a switch fabric directly connected to each resource device and identifying the number of switch fabrics required to connect to other resource devices in the resource device combinations. This information may be obtained from the latency manager of the management module.

For example, a resource device combination that includes processing device A, processing device B, and storage device C may have processing device A directly connected to switch fabric A, processing device B directly connected to switch fabric B, and storage device C directly connected to switch fabric C. Further, switch fabric A may be directly connected to switch fabric B, which is directly connected to switch fabric C. The total latency cost of the resource device combination is calculated by identifying the latency cost between each pair of resource devices and adding the identified latency costs. A latency cost between two directly connected switch fabrics may be associated with one unit of latency. As such, a latency cost between two switch fabrics with an intermediate switch fabric connecting the two may be associated with two units of latency.

Continuing the above example, the latency cost of processing device A and processing device B is one unit of latency. The latency cost between processing device B and storage device C is one unit of latency. The latency cost between processing device A and storage device C is two units of latency. As such, the total latency cost of the resource device combination may be the sum of the aforementioned latency costs (e.g., four).

The total latency cost may be calculated for each identified resource device combination to identify one or more of the resource device combinations with the lowest total latency cost.

In step 306, a set of options for available resource device combinations is provided to the administrative system. In one or more embodiments of the invention, the set of options specifies the resource device combinations with the lowest total latency costs. In this manner, the administrative system is allowed the option to select among the lowest total latency costs.

In step 308, a selection of the desired resource device combination is obtained. In one or more embodiments of the invention, the selection is obtained from the administrative system. The selection may be one of the set of options of step 306.

In one or more embodiments of the invention, the selection is based on the total latency costs of the resource device combinations. The resource device combination with the lowest total latency cost may be selected by the management module. In such embodiments, step 306 is an optional step in the method.

In one or more embodiments of the invention, if the selection is based on the lowest latency cost, and one or more resource device combinations have a lowest latency cost, the selection may be determined on other factors of the resource device combinations with the lowest total latency cost. For example, the resource device combination may be selected based on the distribution of the resource devices in resource device pools.

Continuing the aforementioned example, if two resource device combinations are associated with the lowest total latency, the resource device combination that specifies resource devices that are in resource device pools with a larger number of under-utilized (e.g., not implementing workloads) resource devices. In this manner, the total utilization of resource devices in each resource device pool is minimized. In other words, the utilization of resource devices are distributed between resource device pools.

In step 310, one or more resource devices are allocated to a workload of the infrastructure persona based on the selection. In one or more embodiments of the invention, the resource devices are allocated by performing configuration, if necessary, to the resource devices in the selection. The configuration may include, for example, installing an operating system on the processing devices, initiating container generation for any applications operated by the processing devices, installing a virtual machine hypervisor, initiating communication between the resource devices in the workload to specify the role of each resource device and to specify how data is to be transferred, and/or any other configuration without departing from the invention.

In step 312, a resource allocation master list is updated based on the allocation. In one or more embodiments of the invention, the resource allocation master list is updated by updating resource device entries associated with the resource devices of the selection to specify a status of "allocated" (or a similar status that specifies an in-use status of the resource devices). The resource devices may further specify the infrastructure persona associated with the workload. In this manner, the resource devices are no longer available for use by other workloads.

FIG. 3B shows a flowchart for updating a workload for an infrastructure persona in accordance with one or more embodiments of the invention. The method shown in FIG. 3B may be performed by, for example, an infrastructure persona generation manager (182, FIG. 1D). Other components of the system illustrated in FIGS. 1A-1D may perform the method of FIG. 3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 320, a resource device replacement request is obtained for a failed resource device associated with a workload. In one or more embodiments of the invention, the resource device replacement request may specify the resource device (also referred to as the failed resource device) that is to be replaced. The resource device replacement request may further specify the resource device type of the failed resource device (e.g., processing device, storage device, network device, etc.).

In step 322, the resource allocation master list is updated to specify a failed status of the failed resource device. In one or more embodiments of the invention, the resource allocation master list is updated by identifying the resource device entries associated with the failed resource devices and modifying the status of the resource device entries to specify a "failed" status.

In step 324, a resource device allocated to the infrastructure persona associated with the workload that is in a "standby" status is selected. In one or more embodiments of the invention, a resource device with a similar type of the failed resource device is selected. For example, if the failed resource device is a processing device, the selected resource device may be a processing device.

In step 326, a resource entry of the selected resource device in the resource allocation master list is updated to specify an "in use" status of the selected resource device.

In step 328, a resource device replacement process is initiated for the selected resource device. In one or more embodiments of the invention, the resource device replacement process includes initiating communication with the selected resource device, notifying other resource devices in the workload to communicate with the selected resource device, enabling any standby configuration in the selected resource device (e.g., booting an operating system in a processing device) to enable operation in the selected resource device. The change in communication may include managing a mapping between the storage devices and the processing devices in the workload. The mapping may be updated to specify an inter-relationship between the selected resource device and the storage devices in the workload. The resource device replacement process may include additional, fewer, and/or different steps without departing from the invention.

Figure 3C:
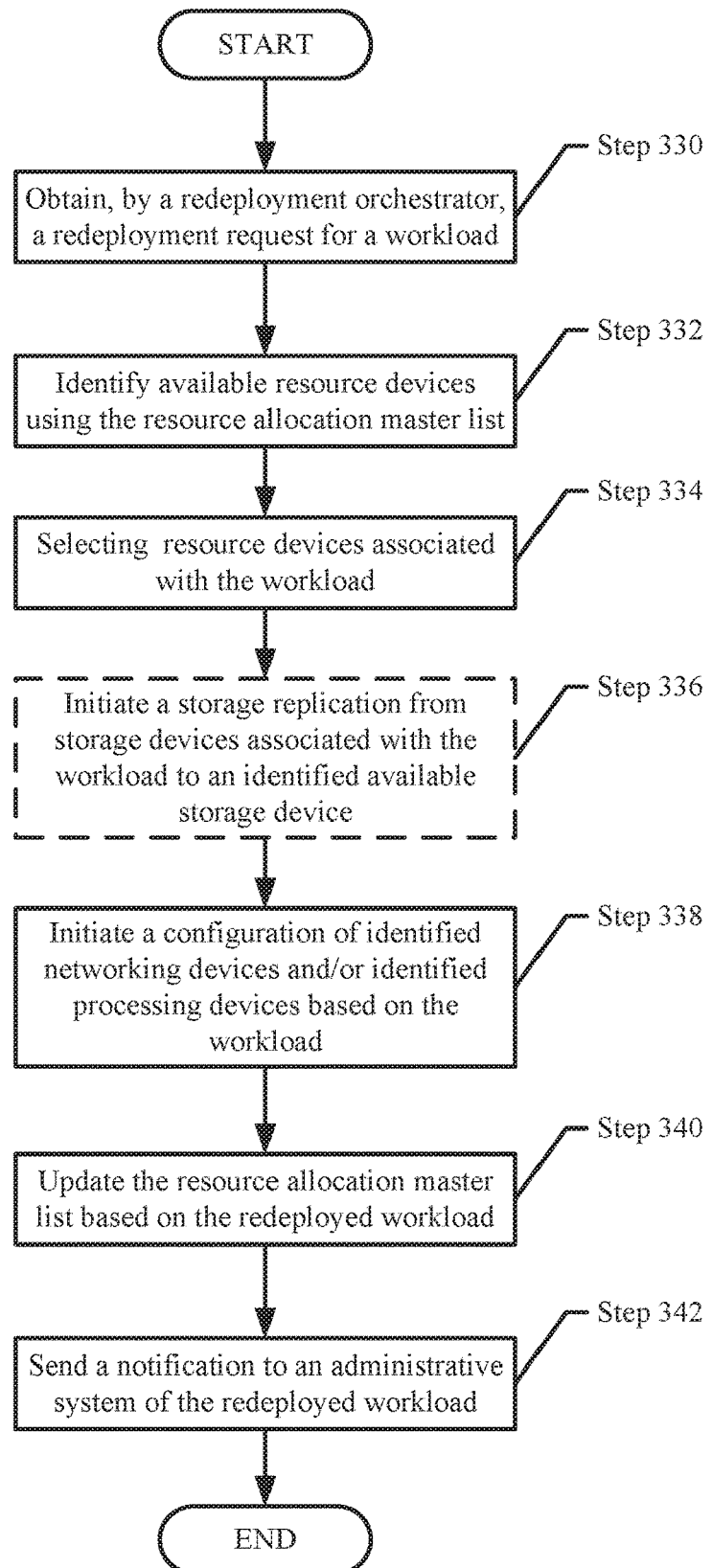
FIG. 3C shows a flowchart for servicing redeployment requests in accordance with one or more embodiments of the invention.

FIG. 3C shows a flowchart for servicing redeployment requests in accordance with one or more embodiments of the invention. The method shown in FIG. 3C may be performed by, for example, a redeployment orchestrator (186, FIG. 1D). Other components of the system illustrated in FIGS. 1A-1D may perform the method of FIG. 3C without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 330, a redeployment request is obtained for a workload. In one or more embodiments of the invention, the redeployment request is obtained from an administrative system requesting to redeploy an underperforming workload. In one or more embodiments of the invention, the redeployment request may specify the performance of the workload and/or in what ways the workload is underperforming.

For example, processing in the workload may be slower and/or less effective than anticipated when a workload generation request for the workload was initially serviced. In such scenario, the administrative system may request to redeploy the workload with higher processing capabilities. The redeployment request may specify workload specifications. As a second example, it may be determined that the workload is performing more efficiently than previously expected. Such workload may be utilizing more resource devices than needed to implement the workload. In such scenario, it may be beneficial to redeploy the workload with fewer resource devices to increase availability of the total resource devices in the composable infrastructure.

Figure 3D:
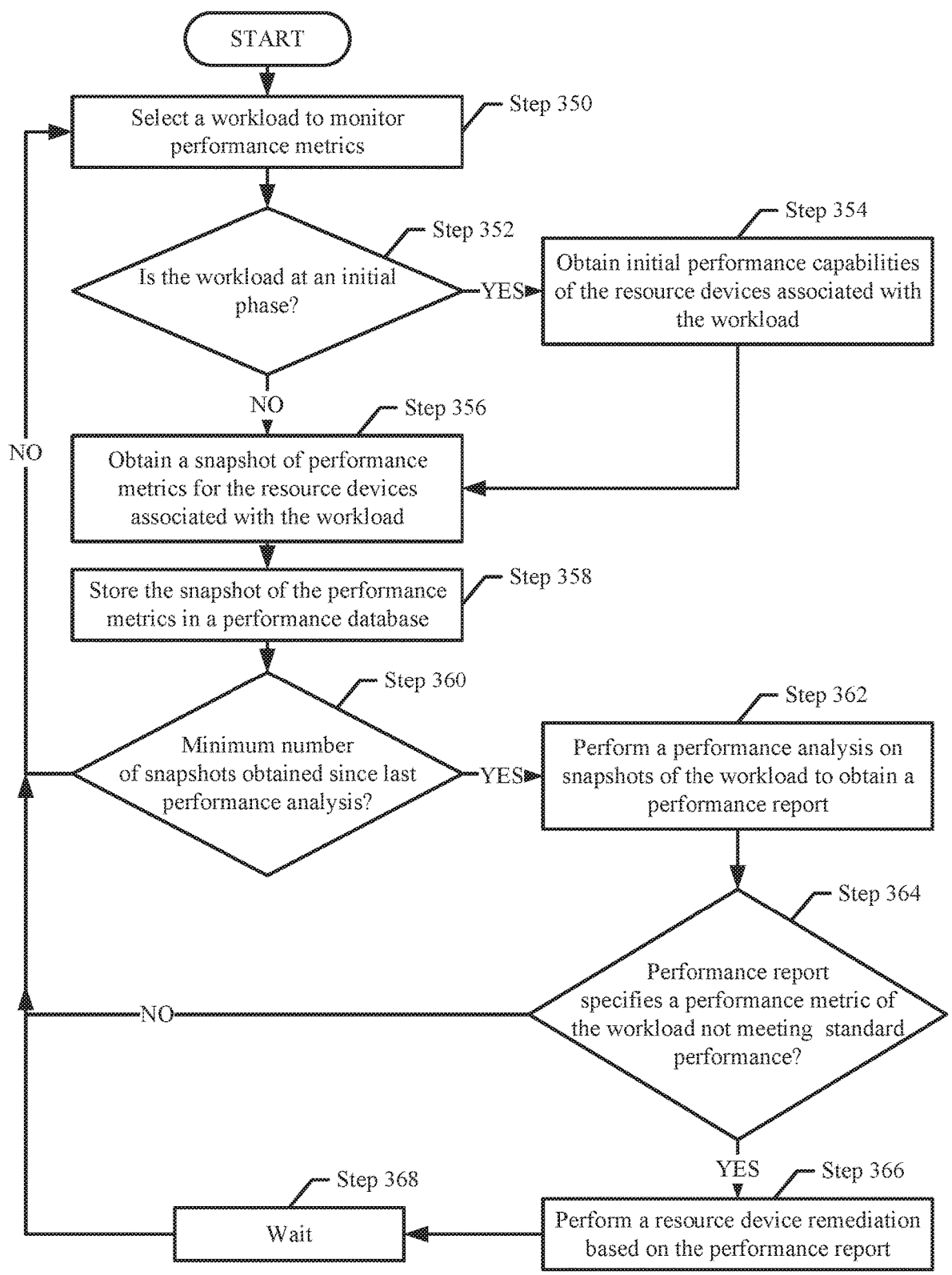
FIG. 3D shows a flowchart for managing performance of resource devices in accordance with one or more embodiments of the invention.

The determination of the workload underperforming or over performing may be based on monitoring of the workload performed in accordance with, for example, the method of FIG. 3D.

In one or more embodiments of the invention, workload specifications refer to desired parameters for a workload to maintain. The workload specifications may specify, for example, processing power (e.g., clock speed, number of cores, types of processing capabilities, cache, etc.), storage availability, bandwidth, and/or any other parameters without departing from the invention.

In step 332, resource devices associated with the workload are identified. In one or more embodiments of the invention, the redeployment orchestrator identifies the resource devices required to properly meet the workload specifications. For example, if a workload specification specifies 500 gigabytes (GB) of storage and the composable infrastructure includes storage devices that can each hold 250 GB of data, the redeployment orchestrator may identify two storage devices to be used to meet the workload specification.

In step 334, available resource devices are selected using the resource allocation master list. In one or more embodiments of the invention, the redeployment manager accesses the resource allocation master list in the management module to identify one or more resource devices that are available for use by the infrastructure persona and that are associated with the identified resource devices of step 332. The management module may select, from the available resource devices, the resource devices to be allocated to the redeployed workload.

In step 336, a storage replication is initiated for storage devices associated with the workload. In one or more embodiments of the invention, the storage replication includes performing a migration from the previous storage device(s) associated with the workload to the selected storage device(s).

In one or more embodiments of the invention, the storage replication is optional based on whether any of the selected resource devices are storage devices. Specifically, if none of the resource devices are storage devices, step 336 may be omitted.

In step 338, a configuration of identified networking and/or identified processing devices is initiated based on the workload. In one or more embodiments of the invention, the configuration of processing devices includes communicating with software installation services to install desired software onto the processing devices. For example, a container configuration software may be installed to the processing device that installs containers on the processing device(s) to enable applications to execute in the installed containers.

Further, a software installation service may install an operating system on the processing device(s) that enable the processing device(s) to operate in accordance with the workload. For example, if the workload is a virtualized cluster, the operating system may include a hypervisor that manages the operation of one or more virtual machines and/or other logical entities executing on the processing devices. As a second example, if the workload is a cloud based service, a software installation service may install a cloud management service on a processing device of the workload to enable the processing device to manage cloud based applications of the cloud based service and to enable communication between the processing device and client devices accessing data and/or utilizing the cloud based applications in the cloud based service. The software installation service(s) may install other software not mentioned in this application without departing from the invention.

In one or more embodiments of the invention, the network devices may be configured in such a way that enables the network to communicate with aforementioned client devices. The network devices may be configured by, for example, assigning an internet protocol (IP) address (or other logical address) to the network device and/or installing a virtual interface that enables the other resource devices in the workload to communicate with client devices via the network device. The network device may be configured via other known and/or later discovered mechanisms without departing from the invention.

In step 340, the resource allocation master list is updated based on the redeployed workload. In one or more embodiments of the invention, the resource allocation master list is updated by modifying the status of the previous resource devices in the workload to a "quarantine" status. Further, each resource device entry of the selected resource devices are modified to specify an "in use" status.

The resource devices in the "quarantine" status may be analyzed (e.g., by the management module, the administrative system, and/or any other entity) to determine whether the resource devices are operational. Any resource devices that are deemed operational after analysis may be tagged with an "available" status. In this manner, the workload is redeployed and operational before waiting for an analysis to determine what caused the previous iteration of the workload to underperform.

In step 342, a notification is sent to an administrative system of the redeployed workload. In one or more embodiments of the invention, the notification may be a message that specifies the selected resource devices.

FIG. 3D shows a flowchart for managing performance of resource devices in accordance with one or more embodiments of the invention. The method shown in FIG. 3D may be performed by, for example, a performance manager (188, FIG. 1D). Other components of the system illustrated in FIGS. 1A-1D may perform the method of FIG. 3D without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 350, a workload to monitor performance metrics is selected. In one or more embodiments of the invention, the workload is selected randomly. The workload may be selected based on a periodic schedule that specifies monitoring a workload after a predetermined time period.

In step 352, a determination is made about whether the workload is at an initial phase. In one or more embodiments of the invention, the workload is deemed to be at an initial phase if the workload was recently generated (e.g., within a predetermined time period). If the workload is at an initial phase, the method proceeds to step 354; otherwise, the method proceeds to step 356.

In step 354, initial performance capabilities of the resource devices associated with the workload are obtained. In one or more embodiments of the invention, the initial performance capabilities are generated by measuring maximum capabilities of the resource device. The maximum capabilities is measured by performing one or more capability tests on the resource devices based on the resource type of each resource device.

In one or more embodiments of the invention, a capabilities test performed on a processing device may include sending a processing command on the processing device and measuring a processing speed. A second capabilities test may include sending multiple processing commands to measure a point in which the processing device is overloaded. Other capabilities tests may be performed on the processing devices without departing from the invention.

In one or more embodiments of the invention, a capabilities test performed on a storage device may include calculating a storage capacity of the storage device by identifying the disk sectors, calculating a disk space of each disk sector (e.g., using known and/or later discovered mechanisms), and calculating a total disk space (e.g., the storage capacity) based on the disk space of each disk sector. A second capabilities test performed on a storage device may include calculating a maximum input/output operations (IOPS) of the storage device.

For example, the maximum IOPS of a storage device that includes a series of hard disk drives may be calculated by measuring an average rotational speed of the disks in the hard disk drives, measuring an average latency of one or more sectors being accessed, measuring an average read time for a predetermined amount of data, and measuring an average read time for the predetermined amount of data. The maximum IOPS may be calculated using the aforementioned measurements and/or any known and/or later discovered formulas. Other capabilities tests may be performed on the storage devices without departing from the invention.

In one or more embodiments of the invention, a capabilities test performed on a network device may include measuring a maximum bandwidth of the networking device by sending a predetermined amount of data across two network devices and measuring the time taken for one of the two network devices to receive the data. The bandwidth may be calculated based on the predetermined amount of data, the measured time, and/or any known and/or later discovered formula for calculating bandwidth (e.g., dividing the predetermined amount of data by the measured time). Other capabilities tests may be performed on the networking devices without departing from the invention.

In step 356, a snapshot of performance metrics for the resource devices associated with the workload are obtained. As discussed above, the performance metrics specifies how the capabilities of the resource devices are being used at a given point in time. The snapshot is obtained by monitoring the resource devices for a given period of time and measuring how each resource device is being utilized. For example, a performance metric of a storage device may be obtained that specifies a total amount of data that the storage device is storing at the given point in time.

In step 358, the snapshot is stored in the performance database. The performance database may be the performance database stored in the management module (e.g., referenced in FIG. 1D).

In step 360, a determination is made about whether a minimum number of snapshots are obtained since the last performance analysis. In one or more embodiments of the invention, the minimum number of snapshots is a predetermined number of snapshots that the performance manager is to obtain before a performance analysis is performed. After a performance analysis is performed, the current number of snapshots resets. If a minimum number of snapshots are obtained since the last performance analysis, the method proceeds to step 362; otherwise, the method proceeds to step 350.

In step 362, a performance analysis is performed on the obtained snapshots of the workload to obtain a performance report. In one or more embodiments of the invention, the performance analysis includes obtaining the most recent snapshots from the performance database after the previous performance analysis, calculating an average usage of the performance metrics in the snapshots over the obtained snapshots, and comparing the usage to standard performance.

In one or more embodiments of the invention, the standard performance is a set of performance thresholds that the performance metrics are to meet. For example, an average CPU usage of the processing devices in the workload may be calculated over the obtained snapshots and compared to a performance threshold of 70%. If the CPU utilization meets or exceeds the performance threshold of 70%, the performance report may specify that the workload does not meet standard performance.

As a second example, an average storage usage may be calculated over the obtained snapshots and compared to a performance threshold of 90%. If the storage usage meets or exceeds the performance threshold of 90% of the total storage capacity of the storage devices in the workload, the performance report may specify that the workload does not meet standard performance.

Each performance metric in the obtained snapshots may be analyzed to the performance criteria to generate a performance report that specifies each performance criteria and whether the performance metrics collectively meet the performance criteria. If any performance criterion is not met, the performance report may specify that the workload does not meet standard performance. In such scenario, the performance report may further specify which performance criteria was not met.

In step 364, a determination is made about whether the performance report specifies at least one performance metric of the workload not meeting standard performance. If the performance report specifies at least one performance metric of the workload not meeting standard performance, the method proceeds to step 366; otherwise, the method proceeds to step 350.

In step 366, following the determination that the workload does not meet standard performance, a resource device remediation is performed based on the performance report. In one or more embodiments of the invention, the resource device remediation is based on the performance criterion (or criteria) that was not met as specified in the performance report.

In one or more embodiments of the invention, the resource device remediation includes performing a redeployment of the workload. The redeployment may be performed via the method illustrated in FIG. 3D. Alternatively, the redeployment may include adding and/or removing a resource device from the workload. For example, if the performance report specifies an over-utilization of CPU of the workload, the resource device remediation includes adding additional processing devices to the workload.

As a second example, if the performance report specifies the workload is under-utilizing its storage (e.g., less than 10% of the total storage capacity of all storage devices of the workload is being utilized), then the resource remediation may include removing one or more storage devices from the workload.

In one or more embodiments of the invention, the resource allocation master list may be updated based on the resource device remediation. For example, if a resource device is removed from the workload, a corresponding resource device entry may be modified to specify an "available" status of the removed resource device. In this manner, the removed device may be utilized to implement another workload associated with another infrastructure persona.

In step 368, the system waits. In one or more embodiments of the invention, the system may wait based on the periodic schedule discussed in step 350.

Figure 3E:
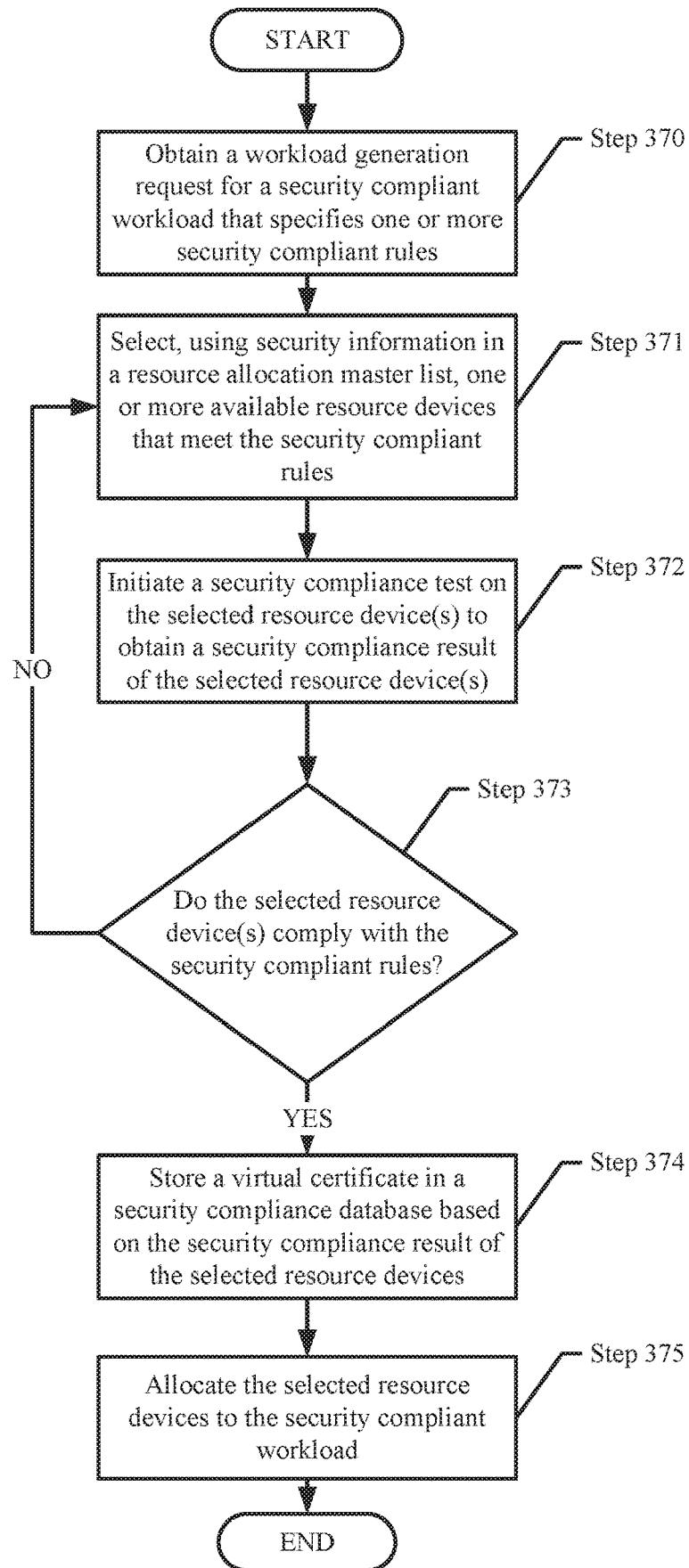
FIG. 3E shows a flowchart for generating a workload that is security compliant in accordance with one or more embodiments of the invention.

FIG. 3E shows a flowchart for generating a workload that is security compliant in accordance with one or more embodiments of the invention. The method shown in FIG. 3E may be performed by, for example, a security compliance manager (189, FIG. 1D). Other components of the system illustrated in FIGS. 1A-1D may perform the method of FIG. 3E without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 370, a workload generation request for a security compliant workload is obtained. The workload generation request may specify one or more resource devices to be utilized by the workload. In one or more embodiments of the invention, the workload is associated with a previously-generated infrastructure persona.

In one or more embodiments of the invention, the workload generation request specifies a set of security compliant rules that the workload is to meet. In one or more embodiments of the invention, a security compliant rule is a rule that sets standards for how data should be stored, generated, and/or transferred by a workload. The security compliant rules may specify, for example, a minimum amount of encryption to be performed on stored data to prevent any undesired entities from accessing the data. The encryption may be performed for an entity of any granularity (e.g., at a volume level, at an application level, at a node level, at a storage device level, etc.).

In one or more embodiments of the invention, the functionality for performing the encryption may be configured on one or more resource devices in the composable infrastructure. The type of encryption a resource device is configured to perform on data may be specified in, for example, the resource allocation master list.

In step 371, one or more available resources are selected that meet the security compliant rules using security compliance information. In one or more embodiments of the invention, the security compliance manager analyzes the resource allocation master list to identify a set of resource devices that each meet the following criteria: (i) are in an "available" status (or otherwise indicate that the resource device may be used to implement the workload), (ii) indicate having the functionality to perform at least the minimum encryption specified in the security compliant rules (such indication may be specified in the security compliance information of the corresponding resource device entry in the resource allocation master list), and (iii) are of a resource type needed to implement the workload. After such resource devices are identified, the security compliance manager selects a set of resource devices to be implemented.

In step 372, a security compliance test is initiated on the selected resource device(s) to obtain security compliance confirmation of the resource device(s). In one or more embodiments of the invention, the security compliance test includes implementing any operation that confirms that the workload complies with the security compliance rules specified in the workload generation request.

In one or more embodiments of the invention, the security compliance test includes a penetration test. The penetration test may be implemented as a simulated cyberattack on the workload. The cyberattack may be, for example, an attempt to access the data in storage devices of the workload by decrypting via unauthorized methods. If the cyberattack results in accessing the data via the unauthorized methods, the results of the penetration test conclude that the workload does not comply with the security compliance rules.

In one or more embodiments of the invention, at least a portion of the security compliance test is performed by a third-party system. In one or more embodiments of the invention, the third-party system is prompted by the security compliance manager to perform the portion of the security compliance test (e.g., the penetration test).

In step 373, a determination is made about whether the selected resource device(s) comply with the security compliance rules. If the resource device(s) comply with the security compliance rules, the method proceeds to step 374; otherwise, the method proceeds to step 371. In other words, a second set of resource devices are selected, and the security compliance test is repeated for the second set of rules.

In step 374, following the determination that the selected resource devices comply with the security compliance rules, a virtual certificate is stored in a security compliance database based on the results of the security compliance test. In one or more embodiments of the invention, the virtual certificate specifies the workload and the selected resource devices used to implement the workload. The virtual certificate may further specify the security compliance rules of which the workload complies.

In one or more embodiments of the invention, the virtual certificate is stored immutably. Said another way, the virtual certificate may not be modified or updated without authorization. The authorization may be performed by, for example, generating a digital signature of the virtual certificate and, during review of the virtual certificate, utilizing the digital signature using known or later discovered methods to determine that the virtual certificate has not been modified and/or altered.

In step 375, the selected resource devices are allocated to the security compliant workload. In one or more embodiments of the invention, the resource devices are allocated by performing configuration, if necessary, to the resource devices in the selection. The configuration may include, for example, installing an operating system on the processing devices, initiating container generation for any applications operated by the processing devices, installing a virtual machine hypervisor, initiating communication between the resource devices in the workload to specify the role of each resource device and to specify how data is to be transferred, and/or any other configuration without departing from the invention.

In one or more embodiments of the invention, the resource devices utilized to implement the security compliant workloads may vary throughout the lifecycle of the security compliant workload. For example, a resource device replacement may be performed in accordance with FIG. 3B that includes replacing a failed resource device implementing the security compliant workload. In such cases in which the resource devices implementing the security compliant workload are replaced, additional security compliance tests may be performed for each new set of resource devices implementing the security compliant workload to ensure the new set complies with the security compliant rules. Additionally, additional virtual certificates are generated and stored for the new sets that comply with the security compliant rules.

Figure 3F:
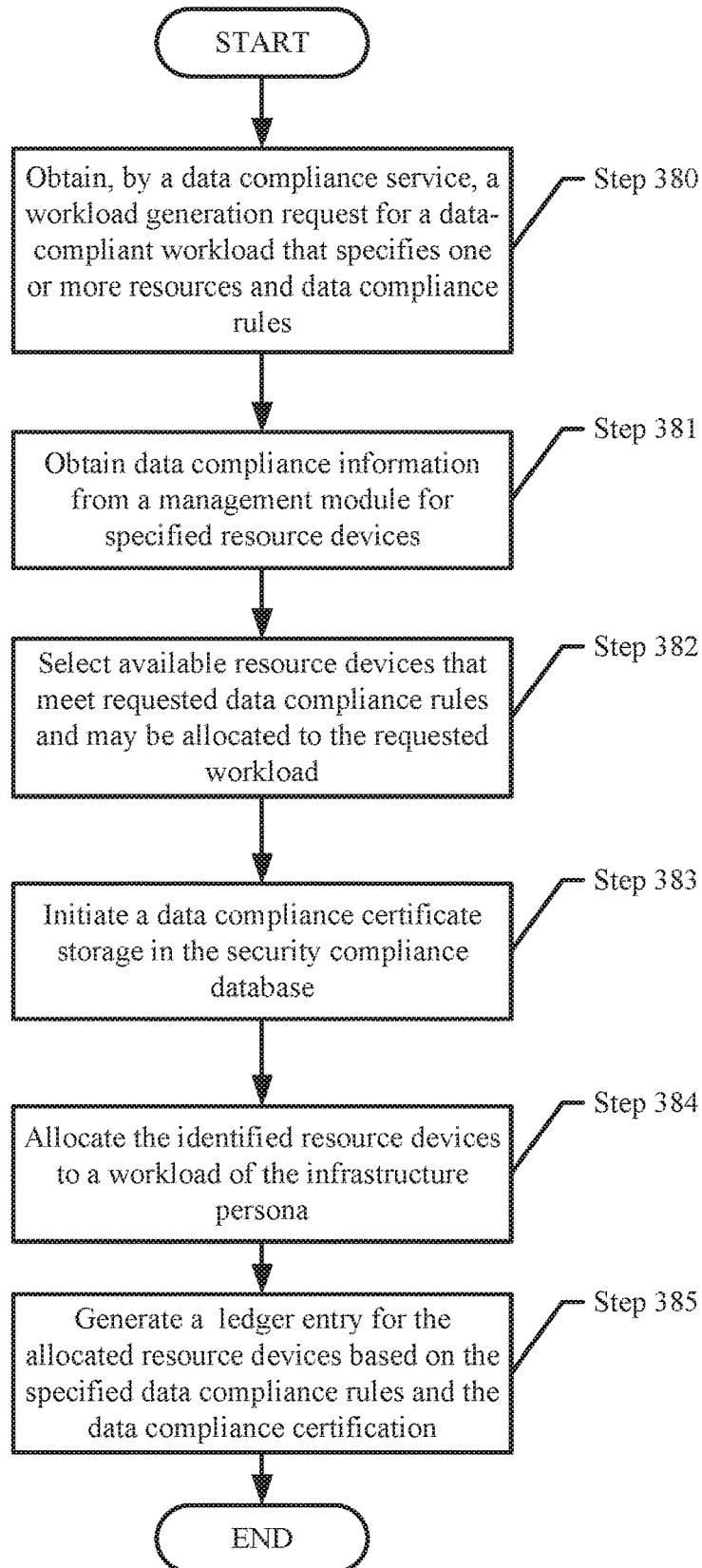
FIG. 3F shows a flowchart for generating a workload that is data compliant in accordance with one or more embodiments of the invention.

FIG. 3F shows a flowchart for generating a workload that is data compliant in accordance with one or more embodiments of the invention. The method shown in FIG. 3F may be performed by, for example, a data compliance service (130, FIG. 1A). Other components of the system illustrated in FIGS. 1A-1D may perform the method of FIG. 3F without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 380, a workload generation request for a data compliant workload is obtained. The workload generation request may specify one or more resource devices to be utilized by the workload. In one or more embodiments of the invention, the workload is associated with a previously-generated infrastructure persona.

In one or more embodiments of the invention, the workload generation request specifies a set of at least one data compliance rules that the workload is to meet. In one or more embodiments of the invention, a data compliance rule is a rule that sets guidelines for how the data is obtained and/or stored. The guidelines may specify, for example, a geographic region in which the resource devices implementing the workload are to be located. As a second example, the guidelines may specify a series of steps (e.g., requesting permission from the entity from which the data is obtained prior to obtaining such data) for how the data is to be obtained. The data may be sensitive information (e.g., information that is not meant to be public), and the series of steps may help prevent the data from being accessed publicly.

In step 381, data compliance information is obtained from a management module for the specified resource devices. In one or more embodiments of the invention, the data compliance information specifies information that may be useful for determining whether the resource devices meet the data compliance rules. For example, the data compliance information may specify a geographical location of each resource device in a composable infrastructure. Further, the data compliance information of processing devices may specify whether the processing devices are equipped with implementing data privacy policies.

In one or more embodiments of the invention, a data privacy policy is a data compliance rule that specifies how the data is obtained and/or distributed from a consumer operating, e.g., a client device. For example, the data compliance information of a processing device may specify whether the processing device is equipped to monitor where the data is transferred within the workload, monitor when the data is transferred outside of the workload, disclose how the data is being utilized within the workload, and/or any other mechanisms that are used to implement the data privacy policies without departing from the invention.

In step 382, available resource devices are selected that meet requested data compliance rules. In one or more embodiments of the invention, the resource devices are identified using the obtained data compliance information. The data compliance service may analyze the data compliance information to identify which resource devices (i) comply with the requested data compliance rules and (ii) are specified as being available for use. The data compliance service selects from the resource devices that meet the aforementioned criteria.

In step 383, a data compliance certification storage is initiated. In one or more embodiments of the invention, the data compliance certification storage includes storing a data compliance certificate in a security compliance database of the management module. The data compliance certificate specifies the selected resource devices and the data compliance rule(s) that the selected resource devices comply with collectively.

In step 384, the selected resource devices are allocated to a workload of the infrastructure persona. In one or more embodiments of the invention, the resource devices are allocated by prompting the management module managing the selected resource devices to perform a configuration, if necessary, on the resource devices in the selection (discussed, e.g., in FIG. 3A).

In step 385, a ledger entry for the allocated resource device is generated and stored in the data compliance service. In one or more embodiments of the invention, the ledger entry is an immutable entry stored in the data compliance service that specifies the selected resource devices and the data compliance certification. The ledger entry may be accessed by the administrative system to determine whether the workload is in compliance with the specified data compliance rule.

In one or more embodiments of the invention, the ledger entry generated in step 385 is associated with a previous ledger entry for the workload. The method of FIG. 3F may be performed in response to an update to a data compliance rule for which the workload was in compliance with. As such, the method of FIG. 3F is performed to ensure that the workload is in compliance with any updates to the data compliance rules, and the ledger entry is stored such that an administrative system (or other entity) accessing the ledger entry may determine that the ledger entry is associated with a ledger entry of a previous iteration of the data compliance rules.

Example 1

The following section describes an example. The example is not intended to limit the invention. The example is illustrated in FIGS. 4.1A-4.1B. Turning to the example, consider a scenario in which a workload is to be implemented. FIG. 4.1A shows an example system with a management module (410) and a chassis system. For the sake of brevity, not all components in the example system are illustrated in FIGS. 4.1A-4.1B.

The management module (410) includes a latency manager (414) that monitors the connections between components in the chassis system (400). The chassis system (400) includes four switch fabrics (switch fabric A (404A), switch fabric B (404B), switch fabric C (404C), and switch fabric D (404D)). As illustrated in FIG. 4.1A, switch fabric A (404A) is directly connected to switch fabric B (404B), switch fabric B (404B) is further directly connected to switch fabric C (404C), and switch fabric C (404C) is further directly connected to switch fabric D (404D).

Further, the chassis system (400) includes four resource devices (processing device A (402A), storage device B (402B), storage device C (402C), network device D (402D), and processing device E (402E)). As illustrated in FIG. 4A, processing device A (402A) is directly connected to switch fabric A (404A), storage device B (402B) is directly connected to switch fabric B (404B), storage device C (402C) is directly connected to switch fabric C (404C), and processing device E (402E) and network device D (402D) are directly connected to switch fabric D (404D). The latency manager (414) monitors these direct connections. While not explicitly illustrated in FIG. 4.1A, the resource devices (402A, 402B, 402C, 402D, 402E) are all in an "available" status.

FIG. 4.1B shows the example system at a later point in time. The example system illustrated in FIG. 4.1B includes the management module (410) and an administrative system (420). The administrative system (420) sends a workload generation request [1]. The workload may be for an application database with a server. The workload generation request specifies a latency aware workload, and specifies utilizing a processing device, two storage devices, and a network device. An infrastructure persona generation manager (412) obtaining the workload generation request utilizes a resource allocation master list (416) to identify available resource devices. The resource devices illustrated in FIG. 4.1A are identified [2].

The identified resource devices are analyzed by the latency manager (414), as prompted by the infrastructure persona generation manager (412), to identify resource device combinations of one processing device, two storage devices, and one network device [3]. Each identified resource device combination is analyzed in accordance with FIG. 3A to calculate a total latency cost. The calculated total latency costs are provided in Table 1:

TABLE 1

Total latency cost for resource device combinations

| Resource Device Combination | Resource Devices | Total Latency Cost |
| --- | --- | --- |
| A | Processing device A, Storage Device B, Storage Device C, Network Device D | 10 units of latency |
| B | Processing device E, Storage Device B, Storage Device C, Network Device D | 7 units of latency |

As illustrated in Table 1, resource device combination A has a total latency of 10 units. The total latency may be calculated by identifying a latency cost for each pair in the resource device combination. For example, for resource device combination A, the latency cost between processing device A (402A) and storage device B is one unit of latency due to processing device A (402A) being one switch fabric away from connecting to storage device B. The latency cost of each pair of resource devices in each resource device combination is similarly calculated and used to calculate each total latency cost.

Based on the calculated latency costs, resource device combination B is selected. The selection is provided to the administrative system (420) with a request for confirmation. The total latency of both resource device combinations are specified in the request for context for the administrative system (420). The administrative system (420) confirms the selection of resource device combination B [4].

After resource device combination B is selected, the management module initiates a workload generation that includes configuring processing device E (402E), storage device B (402B), storage device C (402C), and network device D (402D) to implement the workload specified in the workload generation request.

End of Example 1

Example 2

The following section describes an example. The example is not intended to limit the invention. The example is illustrated in FIGS. 4.2A-4.2B. Turning to the example, consider a scenario in which a processing device in a workload is to be replaced. FIG. 4.2A shows an example system. The example system includes an administrative system (420) and a management module (410). For the sake of brevity, not all components in the example system are illustrated in FIGS. 4.2A-4.2B.

The administrative system (420) sends a resource device replacement request to the management module (410) [5]. The resource device replacement request specifies resource device 0005 has failed and needs to be replaced. Resource device 0005 is a CPU allocated to infrastructure persona AAA.

The management module (410) includes a resource allocation master list (416A) that specifies each resource device and corresponding information such as a corresponding resource device identifier, an infrastructure persona identifier (if any) to which the resource device is allocated, a resource device type, and a status of the resource device.

FIG. 4.2B shows a diagram of the example system at a later point in time. The management module performs the method of FIG. 3B to replace the failed resource device and update the resource allocation master list (416B) in accordance with the replacement. Specifically, the management module (410) modifies the status of resource device 0005 from "In Use" to "Failed" to specify a failed status of the resource device. Further, the management module (410) identifies resource device 0006 as a second CPU that is allocated to infrastructure persona AAA and is previously in a "Standby" status (as shown in FIG. 4.2A). As shown in FIG. 4.2B, the management module (410) modifies the status of resource device 0006 from a "Standby" status to a "In Use" status to specify resource device 0006 to be in use, replacing resource device 0005 [6].

The management module (410) continues the method of FIG. 3B and sends a notification of the update to the resource allocation master list (416B) [7]. Further, the management module initiates a replacement process on the resource device 0006 in the chassis system (400) [8]. Specifically, the management module initiates a boot of the operating system executing on resource device 0006, and sends a notification to each resource device in the corresponding workload (e.g., resource device 0002) to communicate with resource device 0006 instead of resource device 0005. In this manner, the workload continues operation after the failed resource device (i.e., resource device 0005) is replaced.

End of Example 2

Example 3

The following section describes an example. The example is not intended to limit the invention. The example is illustrated in FIGS. 4.3A-4.3B. Turning to the example, consider a scenario in which a redeployment request is initiated for a workload that is under performing. For the sake of brevity, not all components in the example system are illustrated in FIGS. 4.3A-4.3B.

FIG. 4.3A shows a diagram of an example system. The system includes an administrative system (420) and a management module (410). The management module (410) includes a resource allocation master list (416C). The resource allocation master list (416C) specifies six resource devices and their respective statuses. Specifically, the resource allocation master list (416C) specifies resource devices 0007 and 0008 being used to implement a workload associated with resource persona BCB. The workload executed by one CPU (i.e., resource device 0007) and one storage device (i.e., resource device 0008).

The administrative system (420) sends a redeployment request to the management module (410) that specifies redeploying a workload associated with infrastructure persona BCB [9]. The workload is associated with a cloud application. The redeployment request specifies the current workload is underperforming on processing. In other words, the redeployment request specifies that the workload needs to be improved on processing.

FIG. 4.3B shows the example system at a later point in time. At the later point in time, the management module (410) performs the method of FIG. 3C and initiates a redeployment of the workload. Specifically, the management module (410) identifies the resource devices that are to be used for the redeployed workload.

Based on the redeployment request, the management module determines that the redeployed workload is to be implemented using two CPUs and a storage device. Using the resource allocation master list (416C), the management module further identifies and selects resource devices 0009, 0010, and 0012 as the resource devices to be used to implement the redeployed workload. The resource allocation master list is updated accordingly [10]. Specifically, the resource allocation master list (416D) is updated to specify a "quarantine" status for the resource devices of the underperforming workload (i.e., resource devices 0007 and 0008). Further, the resource allocation master list (416D) specifies an "in use" status for the selected resource devices (i.e., resource devices 0009, 0010, and 0012).

Continuing the method of FIG. 3C, the management module (410) initiates a configuration of the processing devices of the selected resource devices [11]. The configuration may include installing an application container on each CPU using an application container installation software (not shown) that enables the CPUs to execute the application of the workload. Further, a data migration is initiated [12]. The data migration includes transferring data associated with the workload from resource device 0008 of the previous implementation of the workload to resource device 0012 of the redeployed workload.

In this manner, resource devices 0009, 0010, and 0012 are equipped to implement the redeployed workload with reduced risk of under-performing on processing. The resource devices of the previous implementation of the workload may be analyzed at a later point in time to determine whether the resource devices may be utilized in the future to implement workloads.

End Example 3

Example 4

The following section describes an example. The example is not intended to limit the invention. The example is illustrated in FIGS. 4.4A-4.4B. Turning to the example, consider a scenario in which a workload is being monitored for its performance. FIG. 4.4A shows a diagram of an example system. The example system includes a management module (410) and a workload (440A) that is implemented by two resource devices (0013 and 0014). For the sake of brevity, not all components in the example system are illustrated in FIGS. 4.4A-4.4B.

The workload is generated by the management module (410) in response to a workload generation request issued by an administrative system (not shown) [12]. At this point in time, the workload is at an initial phase. A performance manager (418) of the management module (410) obtains initial performance capabilities of the resource devices (0013, 0014) [13]. The initial performance capabilities specify that the processing device (i.e., resource device 0013) has a clock speed of 3.9 gigahertz (GHz) and four processor cores. The initial performance capabilities further specify that the storage device (i.e., resource device 0014) includes 1 terabyte (TB) of total disk space. In addition to the initial performance capabilities, a snapshot of the workload is obtained. The snapshot specifies that 20% of the processing device (0013) is in use and that 70% of the total disk space of the storage device (0014) is storing data associated with the workload (440A). The initial performance capabilities and the first snapshot are stored in a performance database (419A) [14].

At a second point in time, after the performance manager waits a predetermined period of time (e.g., two hours), a second snapshot of the workload (440A) is obtained [15]. The second snapshot specifies that 30% of the processing device (0013) is in use and that 80% of the total disk space of the storage device (0014) is storing data associated with the workload (440A). The second snapshot is stored in the performance database (419A) [16].

At a third point in time, after the performance manager waits the predetermined period of time, a third snapshot of the workload (440A) is obtained [17]. The third snapshot specifies that 25% of the processing device (0013) is in use and that 95% of the total disk space of the storage device (0014) is storing data associated with the workload (440A). The third snapshot is stored in the performance database (419A) [18].

After the third snapshot is obtained and stored, the performance manager (418) makes a determination that a minimum number of snapshots of three have been obtained. The performance manager (418) performs a performance analysis in accordance with FIG. 3D. The performance analysis includes obtaining an average CPU usage for the processing device and an average total disk space usage for the storage device and comparing the average values to performance threshold.

The average CPU usage calculated using the snapshots is 25%, and the average total disk space usage is 82%. The performance threshold of the CPU usage is 75%. Because the CPU usage does not exceed the performance threshold of 75% CPU usage, a resource device remediation is not performed for the processing device. A performance threshold of the total disk space usage is 80%. Because the total disk space usage of 82% exceeds the performance threshold of 80% of total disk space usage, the performance manager (418) determines to perform a resource device remediation on the storage device.

FIG. 4.4B shows the example system at a later point in time. The resource device remediation includes updating the workload (440B) by adding a second storage device (i.e., resource device 0015) [20]. The update includes communicating with resource devices 0013 and 0014 to specify the additional storage device [21]. This may enable data associated with the workload (440B) to be stored in the second storage device.

After the second storage device is added to the workload (440B), the resource allocation master list (416E) is updated to specify the update [22]. Specifically, an entry of the second storage device (0015) is modified to specify an "in use" status of the second storage device (0015). In this manner, the second storage device (0015) is allocated to the workload (440B) and may not be inadvertently allocated to a second workload.

End of Example 4

Example 5

The following section describes an example. The example is not intended to limit the invention. The example is illustrated in FIG. 4.5. Turning to the example, consider a scenario in which a workload is to be generated that complies with a security compliant rule. FIG. 4.5 shows a diagram of an example system. The example system includes an administrative system (420) and a management module (410). For the sake of brevity, not all components in the example system are illustrated in FIGS. 4.5.

The administrative system sends a workload generation request to the management module (410) for a workload that complies with the security compliant rule [23]. The security compliant rule may specify that the resource devices of the workload are to be capable of executing an Advanced Encryption Standard (AES) encryption algorithm and/or storing data that has been encrypted using such encryption algorithm. The workload generation request further specifies that the workload is to be implemented by two CPUs and one storage device.

The management module (410) uses a resource allocation master list (416E) to identify resource devices that are: (i) in an "available" status, (ii) meet the resource device needs as specified in the workload generation request, and (iii) specify a capability to handle data using the AES encryption algorithm. The management module selects, from the identified resource devices that meet the aforementioned criteria, resource device 0016, resource device 0017, and resource device 0018.

The management module (410) initiates a security compliance test on the selected resource devices (0016, 0017, 0018) to determine whether the selected resource devices (0016, 0017, 0018) collectively comply with the security compliance rule [24]. Specifically, the security compliance test includes installing an operating system on the CPUs (i.e., 0016 and 0017) that includes processing instructions for executing the AES encryption algorithm and for storing the encrypted data in a storage device. The security compliance test further includes initiating a penetration test. The penetration test is initiated by prompting a third party system (not shown) to execute an initial assessment of the configuration of the workload (440B) and to attempt to decrypt the data stored in the workload (440B) without using an encryption key (e.g., in an unauthorized manner). The results of the penetration test may include being unable to decrypt the data. Such results are sent to the management module (410) [25].

Based on the results of the security compliance test, the management module (410) determines that the workload (432B) is compliant with the security compliant rule. A virtual certificate is stored in a security compliance database (419B) that specifies the workload (440B), the resource devices (i.e., 0016, 0017, 0018) used to implement the workload (440B), and the security compliant rule that the workload complies with [26]. In this manner, future workload generation requests that specify the security compliant rule may analyze the security compliance database (419B) to determine that resource devices 0016, 0017, and 0018 collectively comply with the security compliance rules and may be utilized for future workloads when they become available.

End of Example 5

Example 6

The following section describes an example. The example is not intended to limit the invention. The example is illustrated in FIGS. 4.6A-4.6B. Turning to the example, consider a scenario in which a workload is to be generated that complies with a data compliance rule. FIG. 4.6A shows a diagram of an example system. The example system includes an administrative system (420), a chassis system (400), and a data compliance service (430). For the sake of brevity, not all components in the example system are illustrated in FIGS. 4.6A-4.6B.

The administrative system sends a workload generation request to the data compliance service (430) for a workload that complies with the data compliance rule [27]. The data compliant rule may specify that the resource devices of the workload are to be physically located within the state of California. The workload generation request further specifies that the workload is to be implemented by one processing device and one storage device.

The data compliance service (430) in response to the workload generation request, sends a request to a management module (410) of the chassis system that specifies the data compliance information of resource devices in the chassis system (400). The data compliance information may specify the geographical locations of each resource device in the chassis system. The management module (410), in response to the request, sends the data compliance information to the data compliance service (430) [28]. The data compliance information specifies that resource devices 0021, 0023, and 0024 of the chassis system (400) are located in San Diego, Calif. and that resource device 0022 is located in Tijuana, Mexico. Resource devices 0021 and 0022 are processing devices. Resource devices 0023 and 0024 are storage devices.

Based on this data compliance information, the data compliance service (430) selects one processing device and one storage device out of the eligible resource devices (i.e., 0021, 0023, and 0024). The data compliance service (430) selects processing device 0021 and storage device 0023.

FIG. 4.6B shows the example system at a later point in time. The management module (410) is prompted by the data compliance service (430) to allocate resource devices 0021 and 0023 to a workload associated with the workload generation request. The management module (410), in response to the prompting, generates the workload (440C) and allocates resource devices 0021 and 0023 to the workload (432C) [29].

Further, after the selected resource devices are allocated, the data compliance service (430) stores a ledger entry that specifies the selected resource devices (i.e., 0021 and 0023) and generates a data compliance certificate that is stored in the ledger entry that specifies the data compliance rule with which the workload complies [30]. The data compliance certificate is stored in a security compliance database (not shown) of the management module (410). In this manner, a client (not shown) of the workload (440C) may refer to the ledger entry or the management module (410) to determine whether the workload (440C) is in compliance with the data compliance rule.

End of Example 6

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the ability to perform operations using computing devices. Specifically, embodiments of the invention enable administrative systems implementing workloads to select available resource devices from one or more resource device pools to be used to implement such workloads. The resource devices may be distributed regardless of the physical locations of the resource devices and/or the physical associations to a computing device. In other words, resource devices of one computing device may be utilized for multiple independent workloads that also utilize resource devices of other computing devices. Embodiments of the invention may utilize a resource allocation master list that tracks the usage of the resource devices and enables the resource devices to be allocated to workloads while preventing inadvertent allocation of a resource device to two or more workloads.

Embodiments of the invention enable the redeployment of such workloads in the event that the workloads are not performing to the standard desired by users of the administrative system. Embodiments of the invention may utilize the resource allocation master list to maintain such redeployment in a quick and efficient manner to reduce delay in workload implementation.

Further embodiments of the invention may include monitoring the workloads to obtain performance metrics of the workloads. The performance metrics may be used to perform proactive remediation of the workloads and/or resource devices in the workloads to prevent workload failure.

Finally, embodiments of the invention provide transparency in ensuring that the workloads comply with real-world rules (e.g., security compliance rules or data compliance rules) by storing certificates and/or ledger entries that may be accessed by the administrative system (or other entities) to evaluate the compliance of such workloads.

Thus, embodiments of the invention may address the problem of inefficient use of computing resources. This problem arises due to the technological nature of the environment in which resource devices are utilized.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
obtaining a workload generation request, wherein the workload generation request specifies a security compliant rule;
in response to the workload generation request:
selecting a first set of resource devices using a resource allocation master list;
initiating a security compliance test on the first set of resource devices to obtain a security compliance result;
making a first determination, based on the security compliance result, that the first set of resource devices meet a security compliance criterion; and
in response to the first determination:
storing a virtual certificate in a security compliance database based on the security compliance result; and
allocating the first set of resource devices to a workload based on the workload generation request;
obtaining a second workload generation request, wherein the second workload generation request specifies the security compliant rule;
in response to the second workload generation request:
selecting a second set of resource devices using the resource allocation master list;
initiating the security compliance test on the second set of resource devices to obtain a second security compliance result;
making a second determination, based on the second security compliance result, that the second set of resource devices do not meet the security compliance criterion; and
in response to the second determination:
selecting a third set of resource devices using the resource allocation master list;
initiating the security compliance test on the third set of resource devices to obtain a third security compliance result;
making a third determination, based on the third security compliance result, that the third set of resource devices meet the security compliance criterion; and
in response to the third determination:
storing a second virtual certificate in the security compliance database based on the third security compliance result; and
allocating the third set of resource devices to a second workload based on the workload generation request.

2. The method of claim 1, wherein the security compliance criterion is based on the security compliant rule.

3. The method of claim 1, wherein the security compliant rule specifies an encryption algorithm.

4. The method of claim 1, wherein the security compliance test comprises:
performing a penetration test on data stored in at least one resource device in the first set of resource devices;
making a second determination, based on the penetration test, that the data is not accessible without authorization; and
in response to the second determination, generating the security compliance result, wherein the security compliance result specifies the second determination.

5. The method of claim 4, wherein initiating the security compliance test comprises prompting a third-party application to perform the security compliance test.

6. The method of claim 1, wherein a resource device in the first set of resource devices is a storage device.

7. A non-transitory computer readable medium comprising computer readable program code, which when executed by a computer processor enables the computer processor to perform a method for managing data, the method comprising:
obtaining a workload generation request, wherein the workload generation request specifies a security compliant rule;

in response to the workload generation request:
  selecting a first set of resource devices using a resource allocation master list;
  initiating a security compliance test on the first set of resource devices to obtain a security compliance result;
  making a first determination, based on the security compliance result, that the first set of resource devices meet a security compliance criterion; and
  in response to the first determination:
    storing a virtual certificate in a security compliance database based on the security compliance result; and
    allocating the first set of resource devices to a workload based on the workload generation request;
obtaining a second workload generation request, wherein the second workload generation request specifies the security compliant rule;
in response to the second workload generation request:
  selecting a second set of resource devices using the resource allocation master list;
  initiating the security compliance test on the second set of resource devices to obtain a second security compliance result;
  making a second determination, based on the second security compliance result, that the second set of resource devices do not meet the security compliance criterion; and
  in response to the second determination:
    selecting a third set of resource devices using the resource allocation master list;
    initiating the security compliance test on the third set of resource devices to obtain a third security compliance result;
    making a third determination, based on the third security compliance result, that the third set of resource devices meet the security compliance criterion; and
    in response to the third determination:
      storing a second virtual certificate in the security compliance database based on the third security compliance result; and
      allocating the third set of resource devices to a second workload based on the workload generation request.

8. The non-transitory computer readable medium of claim 7, wherein the security compliance criterion is based on the security compliant rule.

9. The non-transitory computer readable medium of claim 7, wherein the security compliant rule specifies an encryption algorithm.

10. The non-transitory computer readable medium of claim 7, wherein the security compliance test comprises:
  performing a penetration test on data stored in at least one resource device in the first set of resource devices;
  making a second determination, based on the penetration test, that the data is not accessible without authorization; and
  in response to the second determination, generating the security compliance result, wherein the security compliance result specifies the second determination.

11. The non-transitory computer readable medium of claim 10, wherein initiating the security compliance test comprises prompting a third-party application to perform the security compliance test.

12. The non-transitory computer readable medium of claim 7, wherein a resource device in the first set of resource devices is a storage device.

13. A system, comprising:
a processor; and
memory comprising instructions, which when executed by the processor, perform a method, the method comprising:
  obtaining a workload generation request, wherein the workload generation request specifies a security compliant rule;
  in response to the workload generation request:
    selecting a first set of resource devices using a resource allocation master list;
    initiating a security compliance test on the first set of resource devices to obtain a security compliance result;
    making a first determination, based on the security compliance result, that the first set of resource devices meet a security compliance criterion; and
    in response to the first determination:
      storing a virtual certificate in a security compliance database based on the security compliance result; and
      allocating the first set of resource devices to a workload based on the workload generation request;
  obtaining a second workload generation request, wherein the second workload generation request specifies the security compliant rule;
  in response to the second workload generation request:
    selecting a second set of resource devices using the resource allocation master list;
    initiating the security compliance test on the second set of resource devices to obtain a second security compliance result;
    making a second determination, based on the second security compliance result, that the second set of resource devices do not meet the security compliance criterion; and
    in response to the second determination:
      selecting a third set of resource devices using the resource allocation master list;
      initiating the security compliance test on the third set of resource devices to obtain a third security compliance result;
      making a third determination, based on the third security compliance result, that the third set of resource devices meet the security compliance criterion; and
      in response to the third determination:
        storing a second virtual certificate in the security compliance database based on the third security compliance result; and
        allocating the third set of resource devices to a second workload based on the workload generation request.

14. The system of claim 13, wherein the security compliance criterion is based on the security compliant rule.

15. The system of claim 13, wherein the security compliant rule specifies an encryption algorithm.

16. The system of claim 13, wherein the security compliance test comprises:
  performing a penetration test on data stored in at least one resource device in the first set of resource devices;

making a second determination, based on the penetration test, that the data is not accessible without authorization; and in response to the second determination, generating the security compliance result, wherein the security compliance result specifies the second determination.

17. The system of claim 16, wherein initiating the security compliance test comprises prompting a third-party application to perform the security compliance test.

* * * * *